US009352456B2

United States Patent
Murthy et al.

(10) Patent No.: US 9,352,456 B2
(45) Date of Patent: May 31, 2016

(54) POWER TOOL WITH FORCE SENSING ELECTRONIC CLUTCH

(71) Applicant: Black & Decker Inc., Newark, DE (US)

(72) Inventors: Sankarshan Murthy, Mountain View, CA (US); John Howson, Sparks, MD (US); Tal Gottesman, Towson, MD (US); Scott J. Eshleman, Parkville, MD (US); Russell David Hester, Odenton, MD (US); Craig Alan Schell, Maryland, MD (US); Daniel Puzio, Baltimore, MD (US); Daniel L. Schwartz, Timonium, MD (US)

(73) Assignee: Black & Decker Inc., New Britain, CT (US)

( * ) Notice: Subject to any disclaimer, the term of this patent is extended or adjusted under 35 U.S.C. 154(b) by 787 days.

(21) Appl. No.: 13/654,537

(22) Filed: Oct. 18, 2012

(65) Prior Publication Data

US 2013/0105189 A1    May 2, 2013

Related U.S. Application Data

(60) Provisional application No. 61/551,624, filed on Oct. 26, 2011, provisional application No. 61/551,647, filed on Oct. 26, 2011.

(51) Int. Cl.
*B25B 23/14* (2006.01)
*B25B 21/00* (2006.01)
(Continued)

(52) U.S. Cl.
CPC ............ *B25B 21/00* (2013.01); *B25B 23/14* (2013.01); *B25B 23/147* (2013.01); *G01L 5/0042* (2013.01); *G01L 5/0061* (2013.01); *Y10T 477/757* (2015.01)

(58) Field of Classification Search
CPC ....... B25B 21/00; B25B 21/008; B25B 23/14; B25B 23/1405; B25B 23/141
USPC .......................................................... 173/178
See application file for complete search history.

(56) References Cited

U.S. PATENT DOCUMENTS 3,920,082 A * 11/1975 Dudek ......................... 173/182
3,975,954 A    8/1976 Barnich
(Continued)

FOREIGN PATENT DOCUMENTS

EP    0140064 A1    5/1985
EP    1398119 A1    3/2004
(Continued)

OTHER PUBLICATIONS

Matzdorf, UDO—Extended European Search Report re: European Patent Application No. 14180634—Feb. 17, 2015—13 pages—The Hague.
(Continued)

*Primary Examiner* — Gloria R Weeks
(74) *Attorney, Agent, or Firm* — Scott B. Markow

(57) ABSTRACT

A power tool includes a housing, a motor disposed in the housing, a transmission disposed in the housing and coupled to the motor, an output end effector coupled to the transmission, a control circuit for controlling power delivery from a power source to the motor, and a force sensing electronic clutch including a force sensor coupled to a substantially stationary element of the transmission. The force sensor senses a reaction torque transmitted from the end effector to at least a portion of the transmission. The sensor is configured to generate a first electronic signal corresponding to an amount of the reaction torque. The control circuit compares the first electronic signal with a second electronic signal corresponding to a desired threshold torque value, and initiates a protective operation when a value of the first electronic signal indicates that the reaction torque has exceeded the desired threshold torque value.

22 Claims, 20 Drawing Sheets

(51) Int. Cl.
  *B25B 23/147* (2006.01)
  *G01L 5/00* (2006.01)

(56) References Cited

U.S. PATENT DOCUMENTS

| | | | |
|---|---|---|---|
| 4,006,629 A | | 2/1977 | Barrett |
| 4,073,187 A | | 2/1978 | Avdeef |
| 4,426,588 A | | 1/1984 | Weilman |
| 4,643,030 A | | 2/1987 | Becker et al. |
| 4,791,839 A | | 12/1988 | Bickford et al. |
| 4,822,215 A | | 4/1989 | Alexander |
| 4,856,993 A | | 8/1989 | Maness et al. |
| 5,182,953 A * | 2/1993 | Ellinger et al. ......... 73/862.335 |
| 5,410,229 A | | 4/1995 | Sebastian et al. |
| 5,816,121 A * | 10/1998 | Yoshimizu et al. ............ 81/469 |
| 6,536,536 B1 | | 3/2003 | Gass et al. |
| 6,834,730 B2 | | 12/2004 | Gass et al. |
| 6,958,759 B2 | | 10/2005 | Safadi et al. |
| 7,093,668 B2 | | 8/2006 | Gass et al. |
| 7,121,358 B2 | | 10/2006 | Gass et al. |
| 7,328,752 B2 | | 2/2008 | Gass et al. |
| 7,540,334 B2 | | 6/2009 | Gass et al. |
| 7,547,821 B2 | | 6/2009 | Moloney et al. |
| 7,770,658 B2 * | 8/2010 | Ito et al. ............................ 173/1 |
| 8,353,363 B2 | | 1/2013 | Hirt et al. |
| 8,674,640 B2 * | 3/2014 | Suda et al. .................... 318/430 |
| 8,991,518 B2 * | 3/2015 | Elsmark ....................... 173/217 |
| 2002/0033267 A1 | 3/2002 | Schweizer et al. |
| 2002/0037785 A1 | 3/2002 | Wissmach et al. |
| 2004/0056669 A1 | 3/2004 | Morimoto |
| 2005/0128047 A1 | 6/2005 | Watanabe et al. |
| 2006/0081386 A1 | 4/2006 | Zhang et al. |
| 2007/0084613 A1 | 4/2007 | Zhang et al. |
| 2008/0127711 A1 | 6/2008 | Farag |
| 2009/0014192 A1 * | 1/2009 | Ito et al. ............................ 173/1 |
| 2009/0134966 A1 | 5/2009 | Baker |
| 2010/0050779 A1 | 3/2010 | Pushparaj et al. |
| 2010/0116101 A1 * | 5/2010 | Dral et al. ....................... 81/467 |
| 2011/0000688 A1 * | 1/2011 | Iwata ................................. 173/1 |
| 2011/0051775 A1 | 3/2011 | Ivanov et al. |
| 2011/0185864 A1 | 8/2011 | Ide |
| 2013/0178331 A1 | 7/2013 | Saur |
| 2013/0273682 A1 * | 10/2013 | Cai et al. .......................... 438/50 |
| 2014/0011621 A1 | 1/2014 | Stecket et al. |

FOREIGN PATENT DOCUMENTS

| | | |
|---|---|---|
| EP | 2327895 A1 | 6/2011 |
| EP | 2380704 A1 | 10/2011 |
| EP | 2607028 A2 | 6/2013 |
| GB | 2098528 A | 11/1982 |
| JP | 06-254775 | 9/1994 |
| WO | 9725379 A1 | 7/1997 |
| WO | 2010075820 A1 | 7/2010 |

OTHER PUBLICATIONS

Matzdorf, Udo—Extended European Search Report—Aug. 30, 2013—11 pages—The Hague.

Matzdorf, Udo—European Search Report re corresponding European Patent Application No. 12189909—Oct. 21, 2013—17 pages—The Hague.

Matzdorf, Udo—European Search Report re: European Patent Application No. 141805057—Jan. 13, 2015—13 pages—The Hague.

Matzdorf, Udo—Partial European Search Report re: European Patent Application No. 14180634—Jan. 14, 2015—6 pages—The Hague.

Matzdorf, Udo—Examination Report re: Related European Patent Application No. 14185057.8—Dec. 10, 2015—6 pages—Netherlands.

* cited by examiner

POWER TOOL WITH FORCE SENSING ELECTRONIC CLUTCH

RELATED APPLICATIONS

This application claims priority, under 35 U.S.C. §119(e), to U.S. Provisional Patent Application No. 61/551,624, filed Oct. 26, 2011, titled "Power Tool With Force Sensing Electronic Clutch," and to U.S. Provisional Patent Application No. 61/551,647, filed Oct. 26, 2011, titled "Force Sensor With Graphene-Based Ink." The entirety of each of the foregoing applications is hereby incorporated by reference.

TECHNICAL FIELD

This application relates to a force sensing electronic clutch for a power tool, such as a drill or screwdriver.

BACKGROUND

Many rotary power tools, such as drills and screwdrivers, include a clutch for interrupting power output of the tool when the output torque exceeds a threshold value. Generally, such clutches are mechanical or electronic. A mechanical clutch generally includes a spring that biases one clutching member toward another, such that when the torque is exceeded, the clutch members overcome the spring force to separate the clutch members and interrupt torque transmission. One example of a mechanical clutch is shown in U.S. Pat. No. 7,980,324, which is incorporated by reference. However, mechanical clutches tend to wear out over time, are not usually accurately calibrated, and add a great deal of additional length to the tool due to all of the mechanical parts. An electronic clutch generally infers torque indirectly by sensing another parameter of the system, such as current drawn by the motor or motor speed. An example of such an electronic clutch is shown in U.S. Pat. No. 5,410,229, which is incorporated by reference. Such electronic clutches are notoriously inaccurate. First, current is only a good direct indicator of load torque when the motor is rotating at a constant speed, meaning the motor driving duty cycle and load torque has been constant for a significant amount of time. For cases of high motor acceleration and deceleration, as occurs at tool startup or trigger release, current alone is a very poor indicator of load torque. Second, current readings are most often taken through a shunt in series with the motor and battery. This shunt only accurately measures current when the circuit driving the motor is turned on. When the circuit driving the motor is turned off, the shunt experiences no current flow, which creates an artificially low current reading that without compensation is a poor indicator of torque. Third, using current or motor speed to infer torque has a poor response time, as the current or motor speed reading will often lag the actual output torque by a certain time.

SUMMARY

In an aspect, a rotary power tool has a housing, a motor and a transmission disposed in the housing, an output end effector coupled to the transmission, a controller for controlling power delivery from a power source to the motor, and a force sensing electronic clutch coupled to the transmission and the controller. The force sensing electronic clutch includes a force sensor coupled to a stationary element of the transmission to directly sense reaction torque on the transmission. The sensor generates an electronic signal indicative of the force sensed by the force sensor. The controller compares this electronic sensor with a desired threshold torque value. When the value of the electronic signal indicates that the output torque exceeds the desired threshold torque level, the controller initiates a protective operation.

Implementations of this aspect may include one or more of the following features. The force sensor may include a thin film force sensing resistor. The transmission may be a planetary transmission with the force sensor coupled to a stationary ring gear of the planetary transmission. The force sensor may be supported in a base of a cavity in a gear case. The ring gear may have a radial lug coupled to an exterior of the ring gear. The lug may be coupled to a tangential, radial, or axial plunger that presses against the force sensor directly or indirectly through an intermediate plunger. The threshold torque value may be user adjustable, e.g., by a clutch collar or switch that enables the user to select a clutch setting. The power tool may include a position sensor for sensing the position of the clutch collar or switch, so that the desired threshold torque value can be used. The protective operation may include one or more of interrupting or reducing power to the motor, actively braking the motor (e.g., by shorting across the motor or by reversing the flow of current through the motor for a short time), and/or actuating a mechanical clutch.

The power tool may further have a current sensing electronic clutch that senses current via a current sensing resistor in series with the motor. The power tool may use the force sensing electronic clutch when the motor is running in the forward direction and the current sensing electronic clutch when the motor is running in the reverse direction. In addition or in the alternative, the current sensor can be used to continuously and automatically re-calibrate the signal from the force sensor. For example, the controller may determine when the current sensor by itself is a good indicator of output torque by determining when the tool has run at approximately 100% duty cycle without a significant variation in the sensed current. The controller then takes a measurement of the output torque from the force sensor and determines a compensation factor to add to or subtract from all future measurements from the force sensor until the next re-calibration cycle.

In another aspect, a power tool includes a housing, a motor disposed in the housing, a transmission disposed in the housing and coupled to the motor, an output end effector coupled to the transmission, a control circuit for controlling power delivery from a power source to the motor, and a force sensing electronic clutch including a force sensor coupled to a substantially stationary element of the transmission. The force sensor senses a reaction torque transmitted from the end effector to at least a portion of the transmission. The sensor is configured to generate a first electronic signal corresponding to an amount of the reaction torque. The control circuit compares the first electronic signal with a second electronic signal corresponding to a desired threshold torque value, and initiates a protective operation when a value of the first electronic signal indicates that the reaction torque has exceeded the desired threshold torque value.

Implementations of this aspect may include one or more of the following features. The sensor may include a thin film force sensing resistor. The transmission may include a planetary gear set having a sun gear, at least one planet gear, a ring gear, and a planet gear carrier, and wherein the force sensor is coupled to a substantially stationary gear of the planetary gear set. The force sensor may be coupled to the ring gear. The force sensor may be supported in a base of a cavity in the housing, and the ring gear includes a radial lug that transmits torque to the force sensor.

A clutch setting switch may enable a user to adjust the desired threshold torque value. A position sensor may sense the position of the clutch setting switch. The protective operation may include one or more of interrupting or reducing power to the motor, actively braking the motor, and actuating a mechanical clutch. The sensor may include a first layer having a conductive pattern on a non-conductive substrate, a second layer having a conductive pattern on a non-conductive substrate, and a third layer between the first layer and the second layer, the third layer having a resistive or semi-conductive pattern on a non-nonconductive substrate. The resistive or conductive pattern may be printed with an material containing graphene.

A current sensing electronic clutch may includes a current sensor that generates a current signal that corresponds to an amount current delivered to the motor, and that causes the controller to initiate a protective operation when a value from the current sensor exceeds a current threshold value that corresponds to the desired threshold torque value. The force sensing electronic clutch may be activated and the current sensing electronic clutch may be deactivated when the motor is running in the forward direction, and the force sensing electronic clutch may be deactivated and the current sensing electronic clutch may be activated when the motor is running in the reverse direction. The control circuit may use the current signal automatically re-calibrates the first electronic signal from the force sensor, during a period when the control circuit determines that the current signal by itself is a good indicator of output torque. The control circuit may re-calibrate the first electronic signal by determining a compensation factor to add to or subtract from the first electronic signal based on the current signal.

In another aspect, a method of limiting an output torque in a power tool having a housing, a motor and a transmission disposed in the housing, and an output end effector coupled to the transmission, includes the following. A force sensor is coupled to a substantially stationary element of the transmission. A first electronic signal is received from the force sensor that corresponds to a value of a reaction torque transmitted from the end effector to the substantially stationary element of the transmission. The first electronic signal is compared to a second electronic signal corresponding to a desired threshold torque value. A protective operation is initiated when a value of the first electronic signal indicates that the reaction torque has exceeded the desired threshold torque value.

Implementations of this aspect may include one or more of the following. The transmission may include a planetary gear set having a sun gear, at least one planet gear, a ring gear, and a planet gear carrier, and wherein the force sensor is coupled to a substantially stationary gear of the planetary gear set. The second electronic signal may be received from a position sensor that senses a position of a clutch setting switch that enables a user to adjust the desired threshold torque value. Initiating the protective operation may include one or more of interrupting or reducing power to the motor, actively braking the motor, and actuating a mechanical clutch.

In another aspect, a power tool includes a housing, a motor disposed in the housing, a transmission disposed in the housing and coupled to the motor, an output end effector coupled to the transmission, a control circuit for controlling power delivery from a power source to the motor, a force sensing electronic clutch, and a current sensing electronic clutch. The force sensing electronic clutch includes a force sensor that senses a reaction torque transmitted from the end effector to at least a portion of the transmission and causes the control circuit to initiate a first protective operation when the sensed reaction torque exceeds a first threshold torque value. The current sensing electronic clutch includes a current sensor that senses an amount current delivered to the motor, and a controller that causes the controller to initiate a second protective operation when a value from the current sensor exceeds a current threshold value that corresponds to a second threshold torque value. In one implementation, the force sensing electronic clutch may be activated and the current sensing electronic clutch may be deactivated when the motor is running in a forward direction, and the force sensing electronic clutch may be deactivated and the current sensing electronic clutch may be activated when the motor is running in a reverse direction.

In another aspect, a force sensing an electronic clutch for use with a power tool having a motor, a transmission coupled to the motor, and an end effector coupled to the transmission, includes a control circuit for controlling power delivery from a power source to the motor, and a force sensor coupled to a substantially stationary element of the transmission. The force sensor senses a reaction torque transmitted from the end effector to at least a portion of the transmission. The sensor is configured to generate a first electronic signal corresponding to an amount of the reaction torque. The control circuit compares the first electronic signal with a second electronic signal corresponding to a desired threshold torque value, and initiates a protective operation when a value of the first electronic signal indicates that the reaction torque has exceeded the desired threshold torque value.

In another aspect, a method of calibrating a force sensing electronic clutch for a power tool, the force sensing electronic clutch including a force sensor that generates a force value that corresponds to a reaction torque at the end effector, the method includes the following. An amount current delivered to the motor is sensed. A sensed torque value is calculated based on the sensed amount of current. It is determined whether the power tool is operating in a steady state condition. If the power tool is operating in the steady state condition, a correction factor for the force value is determined. In certain implementations of this method the correction factor may be determined by one or more of: (1) calculating a difference between the sensed torque value and a sensed force value sensed at substantially the same time; (2) determining whether the duty cycle is approximately equal to 100%; (3) determining whether the calculated sensed torque value is approximately equal to a previous sensed torque value; and/or (4) determining whether the power tool has been operating in the same steady state for a predetermined amount of time.

Advantages may include one or more of the following. The force sensing electronic clutch provides a compact and far more accurate type of electronic clutch than traditional current sensing electronic clutches. The current sensing clutch provides for continuous and automatic calibration of the force sensing electronic clutch to avoid inaccuracies due to drift of the force vs. resistance response over time or due to temperature variations. The use of a force sensor in the forward direction and a current sensor in the reverse direction eliminates the need for two force sensors, one for each direction. The system reduces the overall length of the power tool. Other advantages and features will be apparent from the description and the drawings.

DETAILED DESCRIPTION

Figure 1:
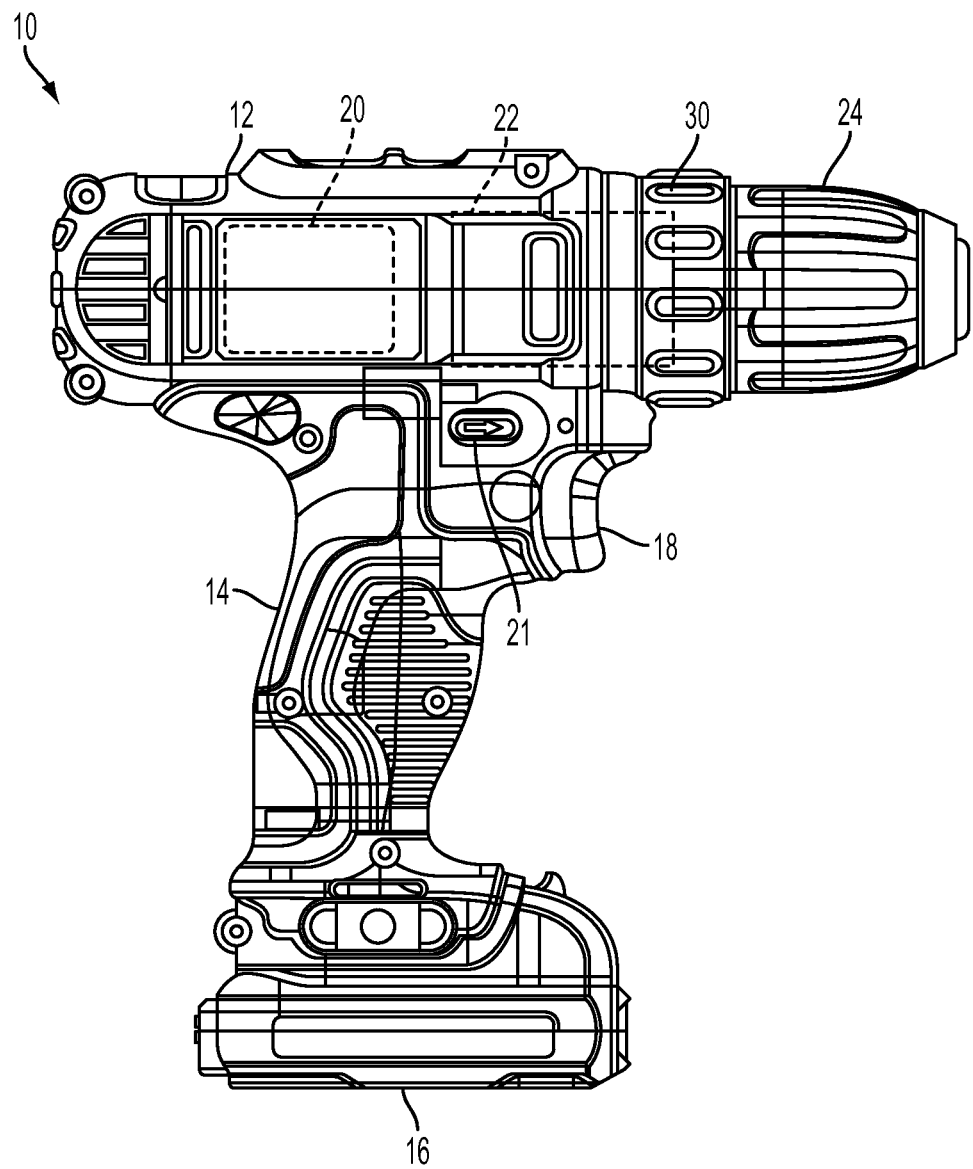
FIG. 1 is a side view of an embodiment of a power tool.
Figure 2:
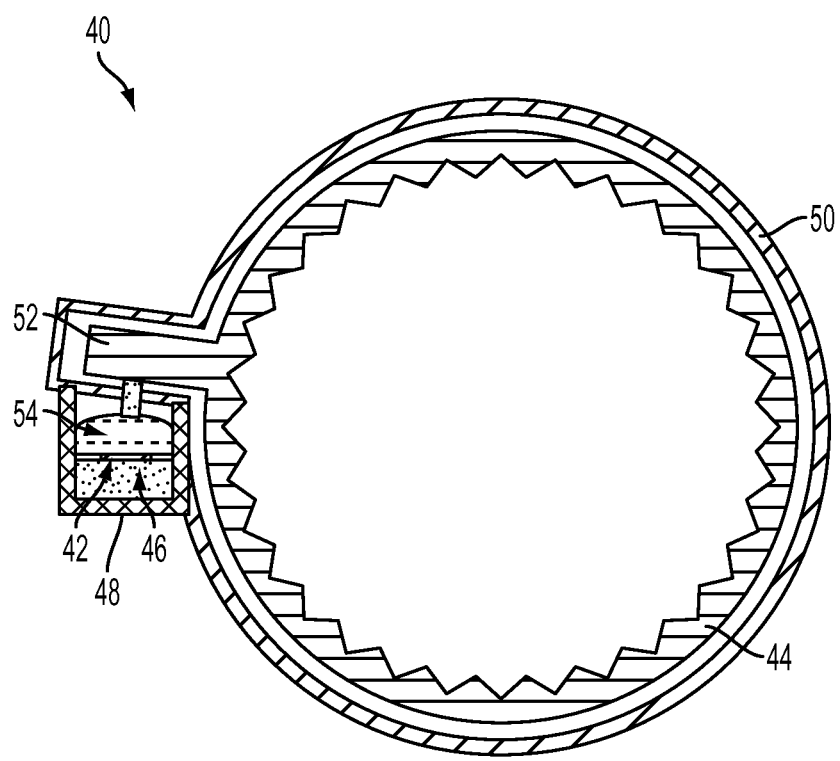
FIG. 2 is a cross-sectional view of a first embodiment of a transmission of a power tool with a force-sensing electronic clutch.
Figure 3:
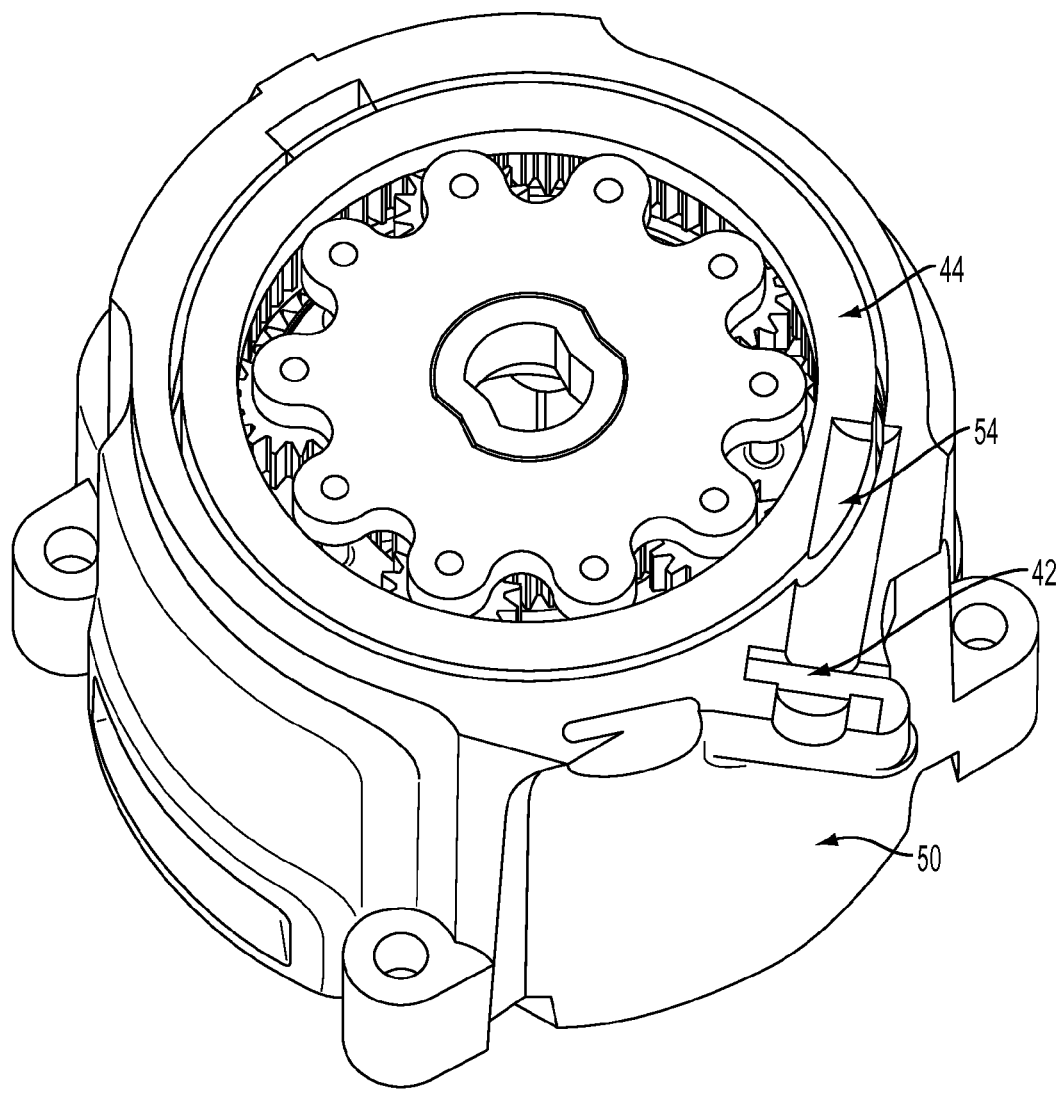
FIG. 3 is a perspective view of the transmission and force-sensing electronic clutch of FIG. 2.

Referring to FIG. 1, a power tool, such as a drill 10, includes a housing 12 and a handle 14 extending from the housing. The tool is coupleable to a power source, such as a battery 16 that is coupleable to the distal end of the handle 14. Disposed in the housing 12 is an electric motor 20 (e.g., an AC, DC, brushless, or universal motor) and a transmission 22 (e.g., a planetary gear transmission). The transmission 22 is connected to a an end effector, e.g., a chuck 24 or other type of tool bit holder so as to transmit power from the motor to the end effector 24. A variable speed trigger switch 18 selectively electrically connects the power source 16 to the motor 20, to control power delivery to the motor. In one embodiment, the switch 18 is coupled to a field effect transistor (FET) control the amount of power delivery to the motor, e.g., by pulse-width modulation (PWM) so that the amount of power delivered to the motor varies with trigger travel.

Figure 4:
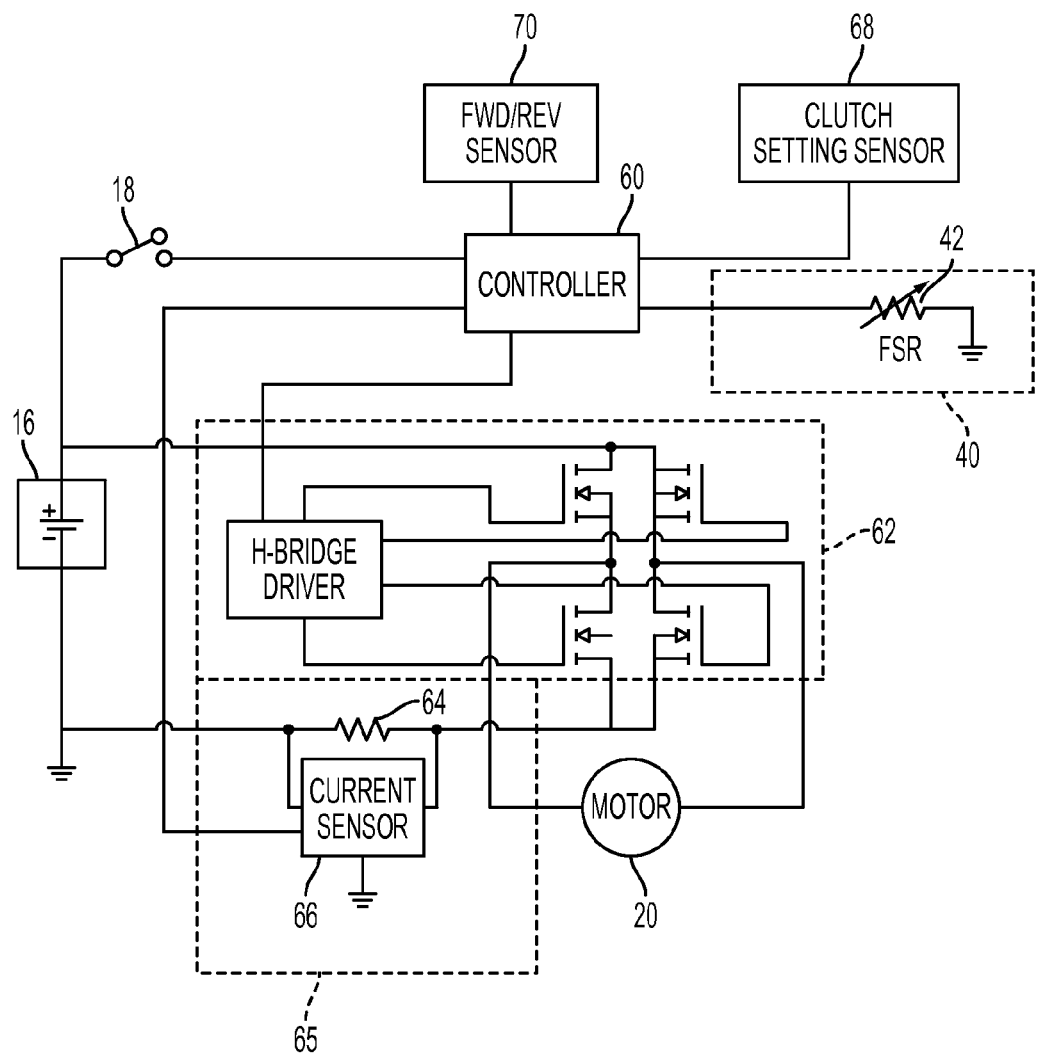
FIG. 4 is a schematic of an embodiment of a control circuit for the power tool and force-sensing electronic clutch of FIGS. 1-3.

Referring also to FIG. 4, the tool 10 includes a control circuit that includes a controller 60, such a microprocessor or tool control circuit, that controls operation of the tool and its components. The power source 16 is electrically connected to a first input of the controller 60 via the trigger switch 18 and/or FET 26. A force sensing electronic clutch 40 is electrically connected to a second input of the controller 60. Optionally, a current sensing electronic clutch 65 is connected to the third input of the controller. Optionally, a clutch setting sensor 68 is connected to the fourth input of the controller 60. Optionally, a forward/reverse sensor 70 is connected to a fifth input of the controller 60. An output of the controller 60 is electrically connected to the motor 20 via a driver circuit, for example an H-bridge driver circuit 62.

Referring also to FIGS. 2, 3, 4, 9 and 10, the force sensing electronic clutch 40 includes a force sensor 42 (e.g., a force sensing thin-film resistor) coupled to a substantially stationary component of the transmission, e.g., a substantially stationary ring gear 44 of a stage of the planetary gear transmission. In the embodiment of FIGS. 2, 3, 4, 9, and 10, the force sensor 42 is disposed in a base 46 of a pocket 48 of a gear case 50 that surrounds the ring gear 44. The ring gear has a radial tab or lug 52 coupled to a plunger 54 that presses against the force sensor 42. The resistance of the force sensor generally varies inversely with the amount of force applied to it. As the output torque increases, so does the torque on the ring gear, which presses the plunger against the force sensor, causing the resistance of the force sensor to decrease. The force sensing circuit 40 generates a signal having a magnitude that is generally proportional or otherwise related to the amount of output torque on the tool. This signal is inputted into the controller 60, which determines when to actuate the clutch by comparing the signal to a predetermined torque threshold level. When the clutch is actuated, the controller 60 initiates a protective operation, e.g., by interrupting or reducing power to the motor and/or actively braking the motor, and/or causing a mechanical clutch to be actuated.

It should be understood that a different type of force sensor, or a different type of force sensor, such as a strain gauge, a torque transducer, or a load cell may be employed to sense the torque on the ring gear. In the illustrated embodiment, the force sensor is a force sensing thin-film resistor. The force sensing thin-film resistor can be composed of, e.g., a layer of conductive or semi-conductive resistive element disposed between two layers of a non-conductive substrate. The resistive element is also coupled to two conductive electrodes, which are used to connect the force sensor to an electronic circuit. When pressure is applied to the non-conductive substrate, it is transferred to the resistive element, which deforms, causing its resistance to decrease as a function of the amount of force applied. Generally, the electrode is composed of a layer of a conductive element, such as silver, while the resistive material is composed of a layer of conductive or pressure-sensitive ink that contains some amount of a metallic element such as silver. Examples of commercially available force sensing thin-film resistors include a through-mode Flexi-Force® sensor sold by TekScan, Inc., a ShuntMode or Thru-Mode Force-Sensing-Resistor sold by Sensitronics, LLC, or a shunt mode FSR® sensor sold by Interlink Electronics, Inc. Other examples of these and similar force sensors can be found in U.S. Pat. Nos. 7,113,179, 7,772,960, 7,785,704, 7,554,531, 7,258,026, 6,032,542, and 4,489,302, which are incorporated by reference. Other embodiments of force sensors that can be used in the present invention are disclosed in a commonly-owned concurrently filed provisional patent application titled "Force Sensor with Graphene Based Ink".

Figure 12:
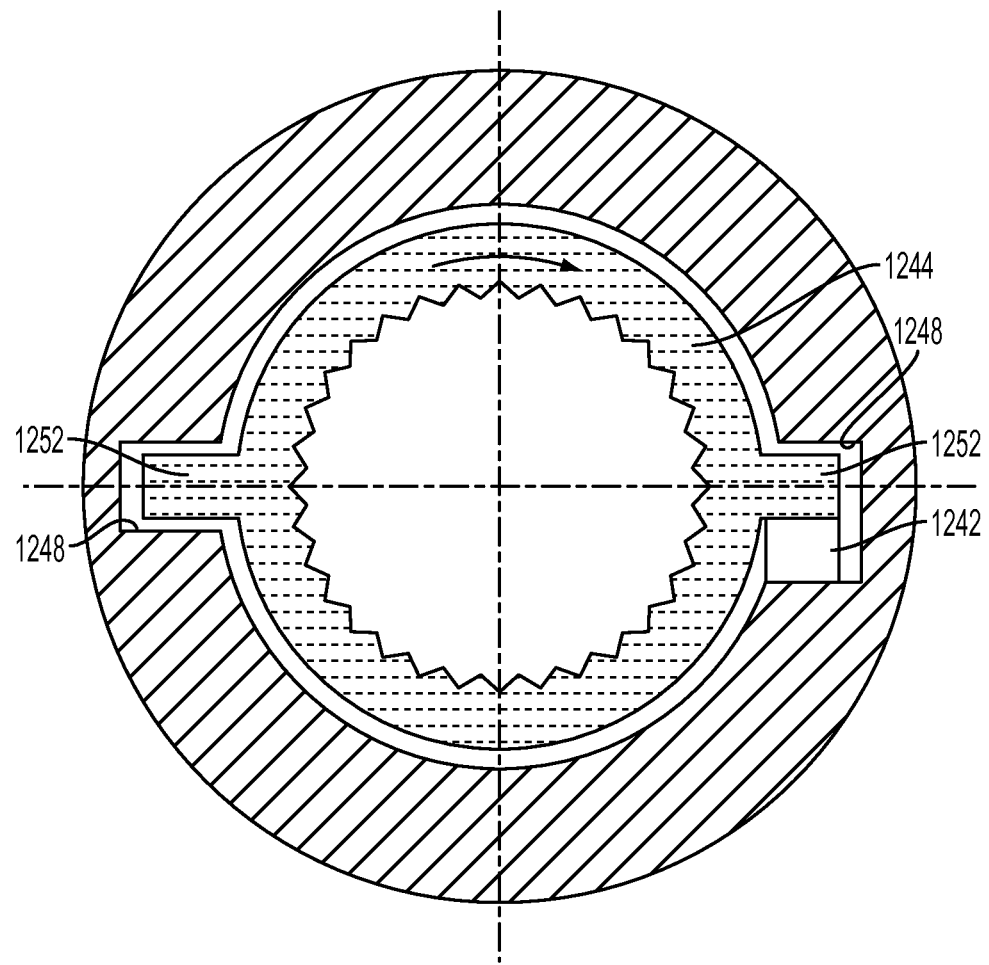
FIG. 12 is a cross-sectional view of a second embodiment of a transmission of a power tool with a force-sensing electronic clutch.
Figure 13:
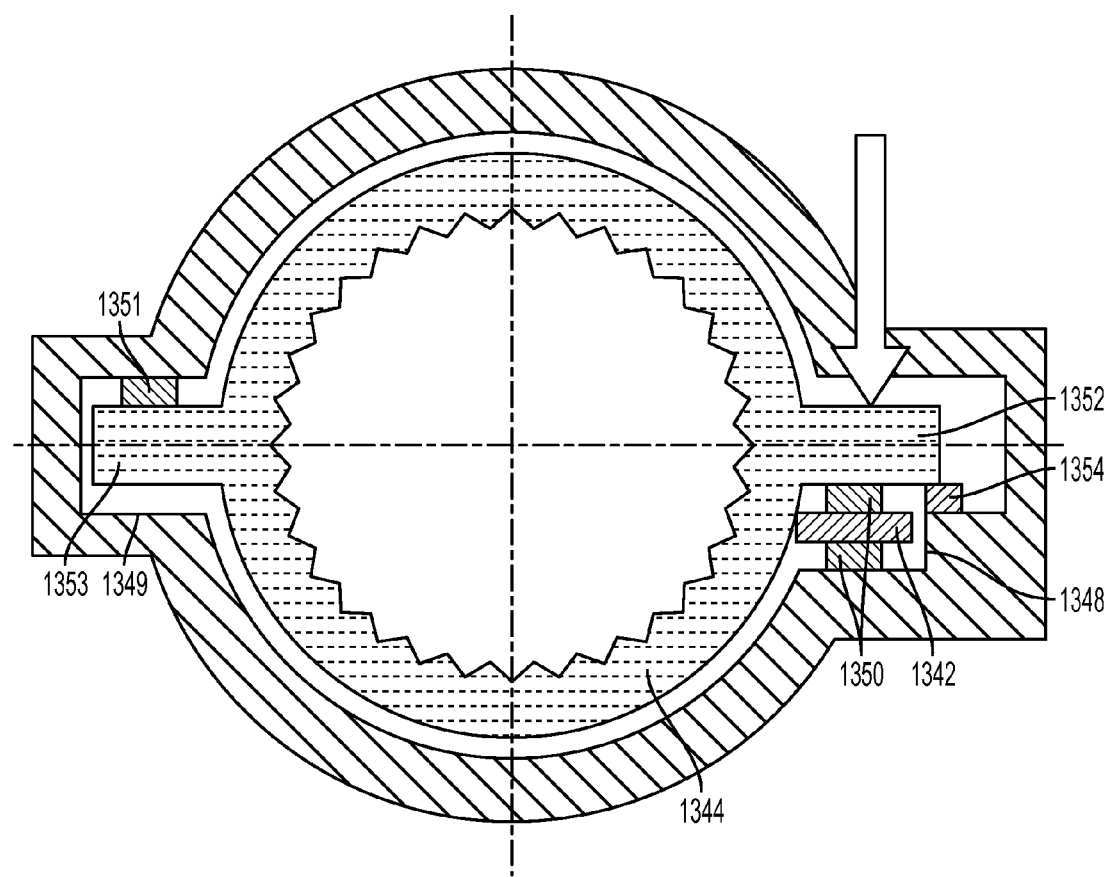
FIG. 13 is a cross-sectional view of a third embodiment of a transmission of a power tool with a force-sensing electronic clutch.

It should be understood that the sensor can be coupled to the ring gear and housing in other configurations. Referring to FIG. 12, in one alternate embodiment, a ring gear 1244 can have two lugs 1252 received in two pockets 1248 in the housing with one force sensor 1242 in one of the pockets 1248 between the lug 1252 and the pocket 1248. This design reduces the amount of load on the force sensor by approximately 50%, as compared to having only a single lug, and reduces the tendency of the ring gear to create an eccentric moment about a single lug. Referring to FIG. 13, in an another alternate embodiment, one or more elastomeric elements or springs 1350 can be sandwiched between the lug 1352 of the ring gear 1344 and the pocket 1348 in the housing to reduce overload of a force sensor 1342. There may also be one or more additional elastomeric elements 1351 between the opposite lug 1353 and pocket 1353 that does not contain a force sensor. In addition, the pocket with the force sensor may include a mechanical stop 1354 to prevent overload of the force sensor.

Figure 15:
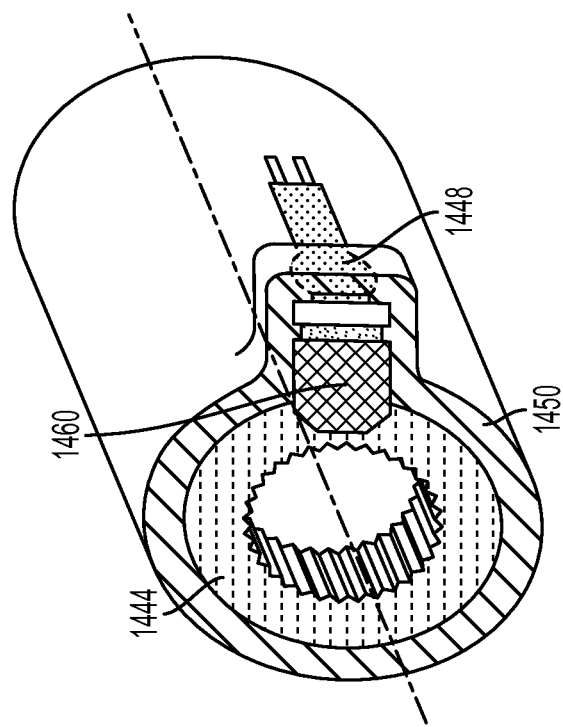
FIG. 15 is a perspective view, partially in cross-section, of the fourth embodiment of a transmission of a power tool with a force-sensing electronic clutch of FIG. 14.
Figure 14:
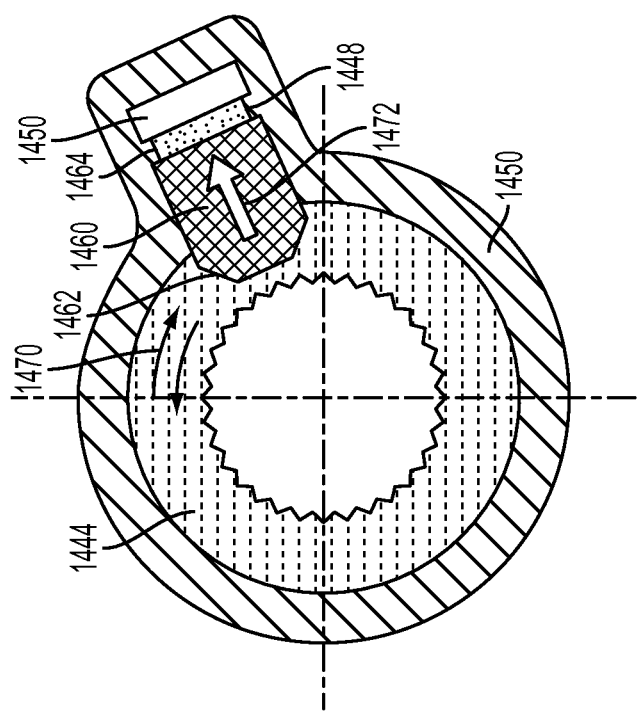
FIG. 14 is a cross-sectional view of a fourth embodiment of a transmission of a power tool with a force-sensing electronic clutch.

Referring to FIGS. 14 and 15, in another alternate embodiment, the ring gear 1444 may be grounded to the housing 1450 by a cam actuator 1460 that is received in a pocket 1448 of the housing and in a cam recess 1462 in the periphery of the ring gear 1444. The force sensor 1450 is also disposed in the pocket between the cam actuator 1460 and the wall of the pocket. An elastomeric element 1464 may be disposed between the cam actuator 1460 and the force sensor 1450 and/or between the force sensor 1450 and the wall of the pocket 1448. As the torque increases on the output, the reaction torque on the ring gear causes the ring gear to rotate in a circumferential direction as indicated by the arrows 1470, which causes the ring gear to push the cam actuator 1460 in the radial direction, against the force sensor 1450, as indicated by the arrow 1472. In this arrangement, the cam angles, can be selected to optimize loading of the force sensor. This arrangement may also provide for thermal isolation of the force sensor from the transmission, and enables a single force sensor to sense torque when the tool is running in both the forward and the reverse directions.

In FIGS. 14-15, the force sensor can be sandwiched between a lug on the transmission housing an a recess on the tool housing, with the ring gear being ground to the transmission housing as is understood in the art. This may provide thermal isolation of the force sensor from the transmission and may simplify wiring the force sensor.

Figure 16:
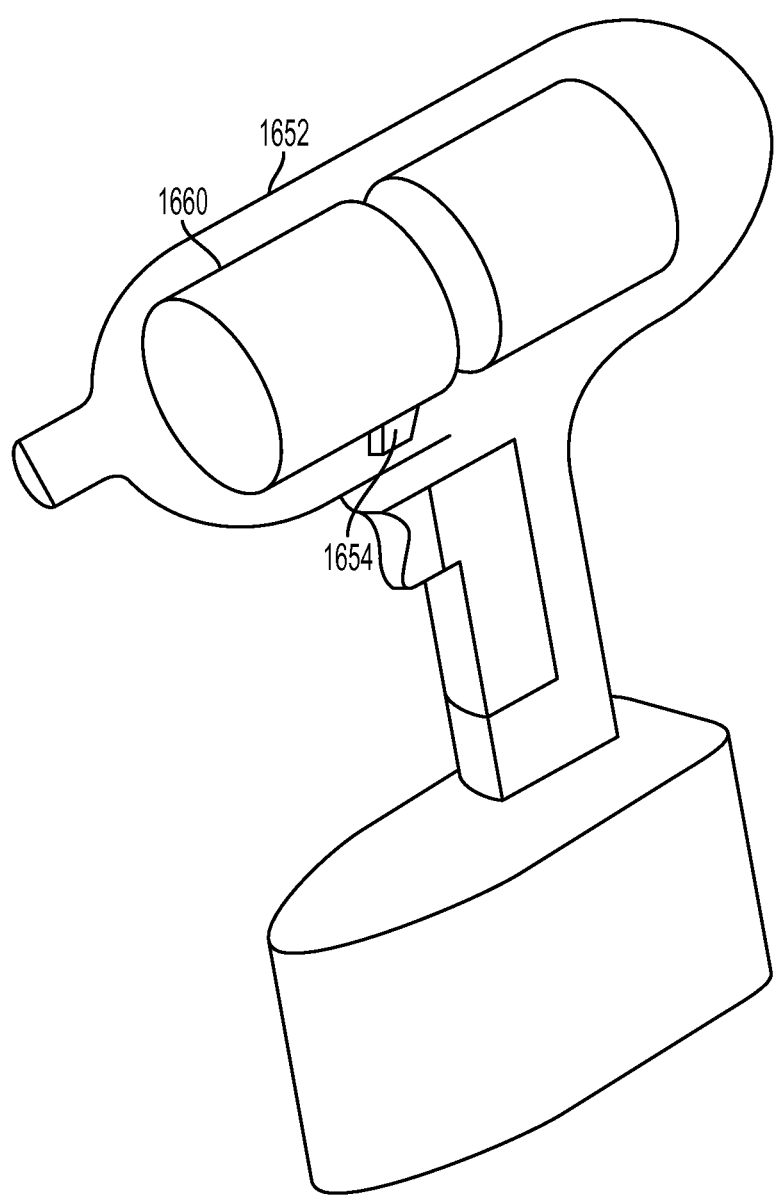
FIG. 16 is a perspective view of a power tool with a fifth embodiment of a transmission with a force-sensing electronic clutch.
Figure 17:
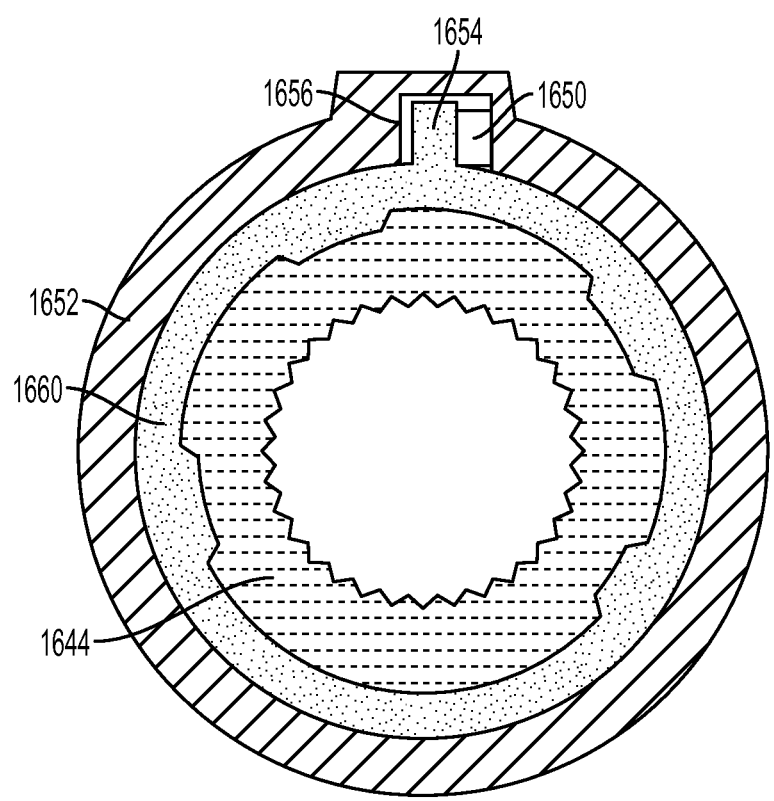
FIG. 17 is a cross-sectional view of the firth embodiment of a transmission of a power tool with a force-sensing electronic clutch of FIG. 16.

It should also be understood that the force sensor can be coupled to another stationary component of the transmission or the tool. For example, as shown in FIGS. 16 and 17, the ring gear 1644 may be attached to the transmission housing 1660 in an ordinary manner, and the transmission housing 1660 may be ground to the tool housing 1652 by a lug 1654 that is received in a pocket 1656 of the tool housing 1652, with the force sensor disposed between the lug 1654 and the walls of the pocket 1656. This may provide for thermal isolation of the force sensor from the high temperatures inside the transmission, and may simplify wiring power to the force sensor. In another possible example, the force sensor can be coupled between the motor housing and the tool housing, or may be coupled to an intermediate drill lock element that is ground to the stationary ring gear through a cam controlled by a collar. The force sensor may also have a spring and/or plunger assembly in series or parallel load path to add or subtract the preload on the sensor.

The current sensing electronic clutch 65 includes a shunt resistor 64 and current sensor 66 that are connected in series between the power source 16 and the motor 20. Alternatively, the shunt resistor may be replaced by utilizing the drain-source resistance of the main drive FET. The shunt resistor 64 and current sensor 66 generate a signal with a magnitude that is proportional to or indicative of the amount of current being drawn by the motor. This signal is inputted into the controller 60 which determines whether to actuate the clutch by comparing the signal to a predetermined torque threshold level. When the clutch is actuated, the controller 60 initiates a protective operation (e.g., interrupts or reduces power to the motor and/or actively brakes the motor). Alternatively, the controller 60 can cause a mechanical clutch to be actuated. In an alternative embodiment (not shown) a sensor such as a Hall effect sensor or tachometer senses the rotational speed of the motor and generates a corresponding signal that can be inputted into the controller for determining when to actuate the clutch. In another alternate embodiment, as discussed below, the signal from the current sensing electronic clutch can be used to calibrate the force sensing clutch.

The optional forward/reverse sensor 70 comprises a sensor that senses a position of a forward/reverse switch 21 and/or a direction of rotation of the motor 20. For example, the forward/reverse sensor can include at least one Hall-effect sensor. The forward/reverse sensor generates a signal indicative of the direction of motor operation and inputs this signal to the controller 60. In certain modes of operation, the controller 60 can use this signal to determine whether to actuate the clutch based on the force sensor signal (e.g., in the forward mode of operation) or based on the current signal (e.g., in the reverse mode of operation).

Figure 8:
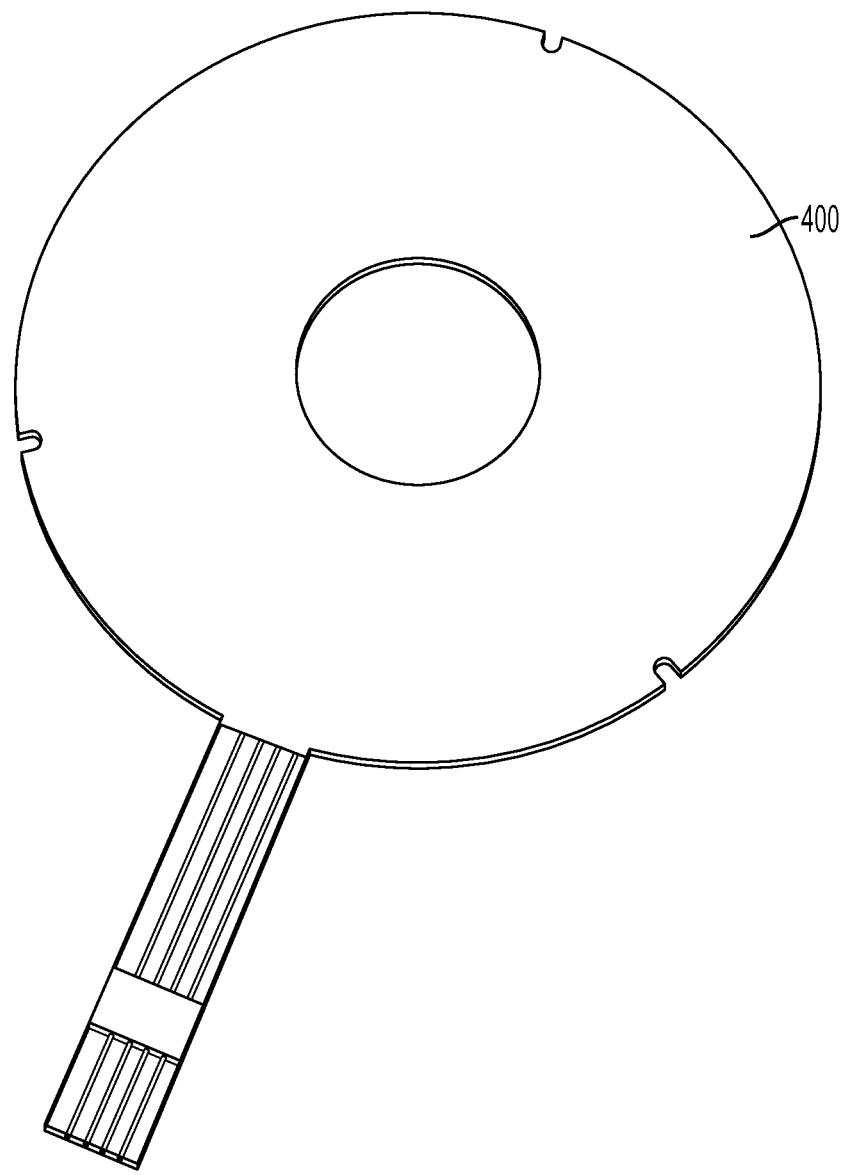
FIG. 8 is a side view of a first embodiment of a force sensitive resistor for use with a force sensing electronic clutch.
Figure 9:
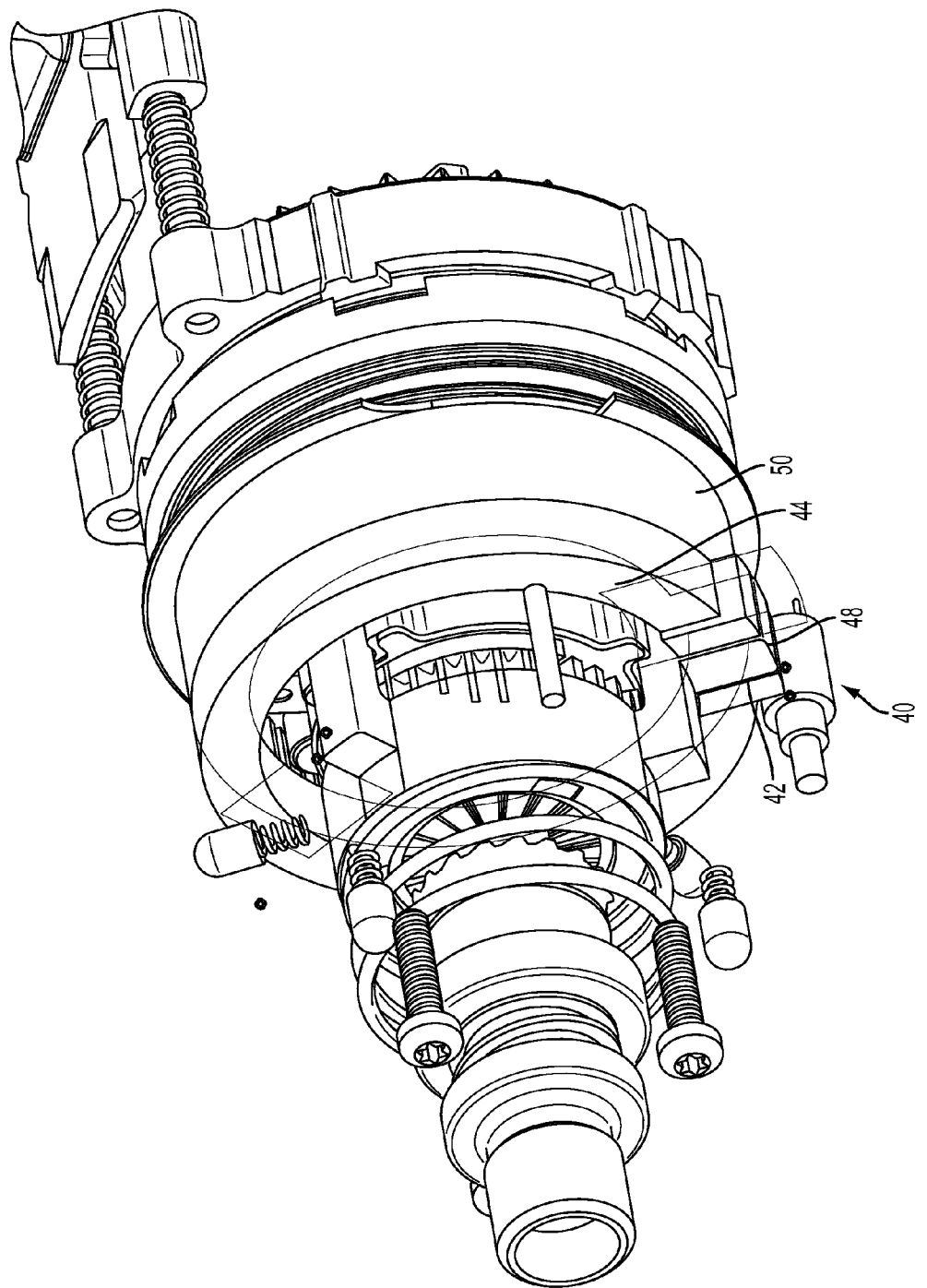
FIG. 9 is a perspective view of the transmission and force sensing electronic clutch of FIGS. 2 and 3.
Figure 10:
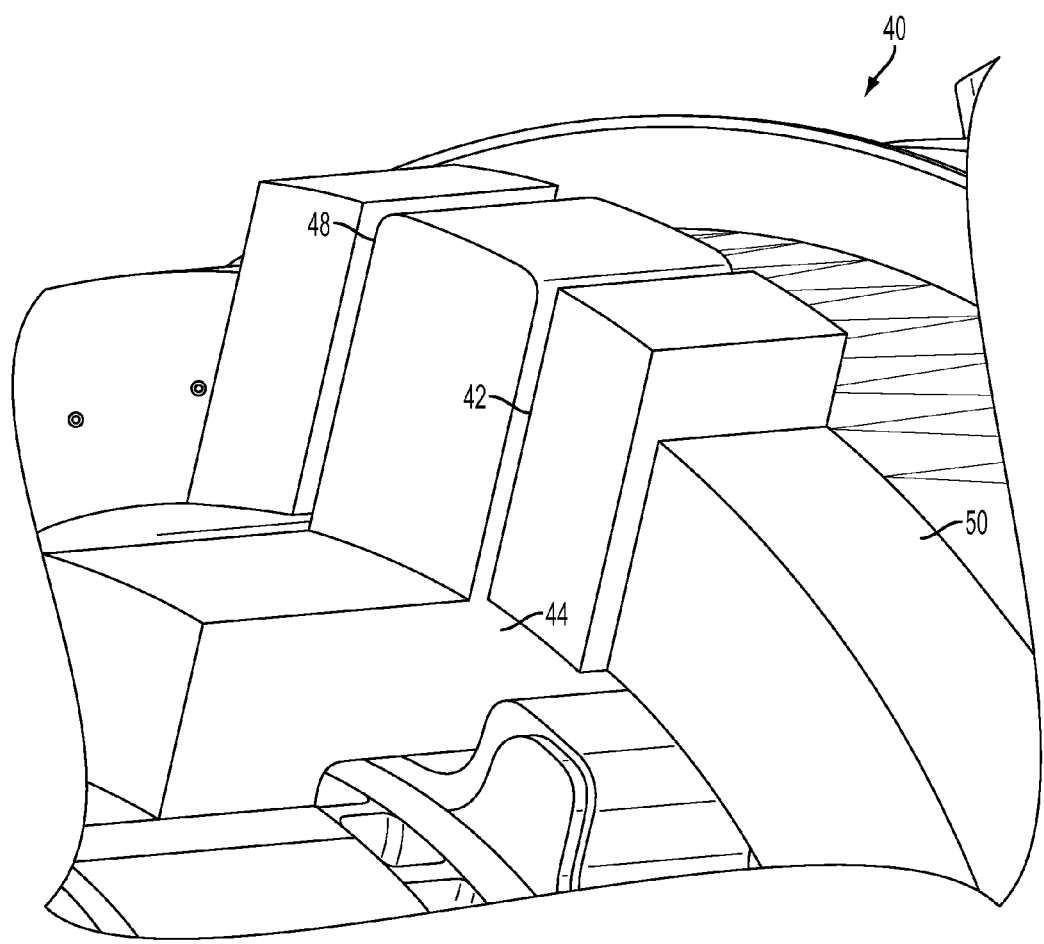
FIG. 10 is a close-up perspective view of the force sensing electronic clutch of FIG. 9.

The tool also includes a clutch collar 30 or other switch can be adjusted by the user to vary the clutch setting of the tool. The clutch setting sensor 68 senses the position of the clutch collar 30 or other switch and generates a signal indicative of the setting for input into the controller 60. The controller 60 may use this signal to determine the clutch set point for comparison to the force sensor clutch signal and/or the current sensing electronic clutch signal, to determine when to actuate the clutch. Referring also to FIG. 8, in one embodiment, the clutch setting sensor may include a circular membrane potentiometer 400, such as a MicroNav Ring sensor sold by Interlink Electronics, Inc. of Camarillo, Calif., U.S.A. In this case, a finger or stylus would extend from the mode/clutch collar and based on the location the membrane potentiometer will provide a discrete resistance that will generate a signal corresponding to the desired clutch setting. Other types of electronic or positional sensors may be used such as a linear membrane potentiometer, a Hall effect sensor, or a potentiometer switch.

Figure 11:
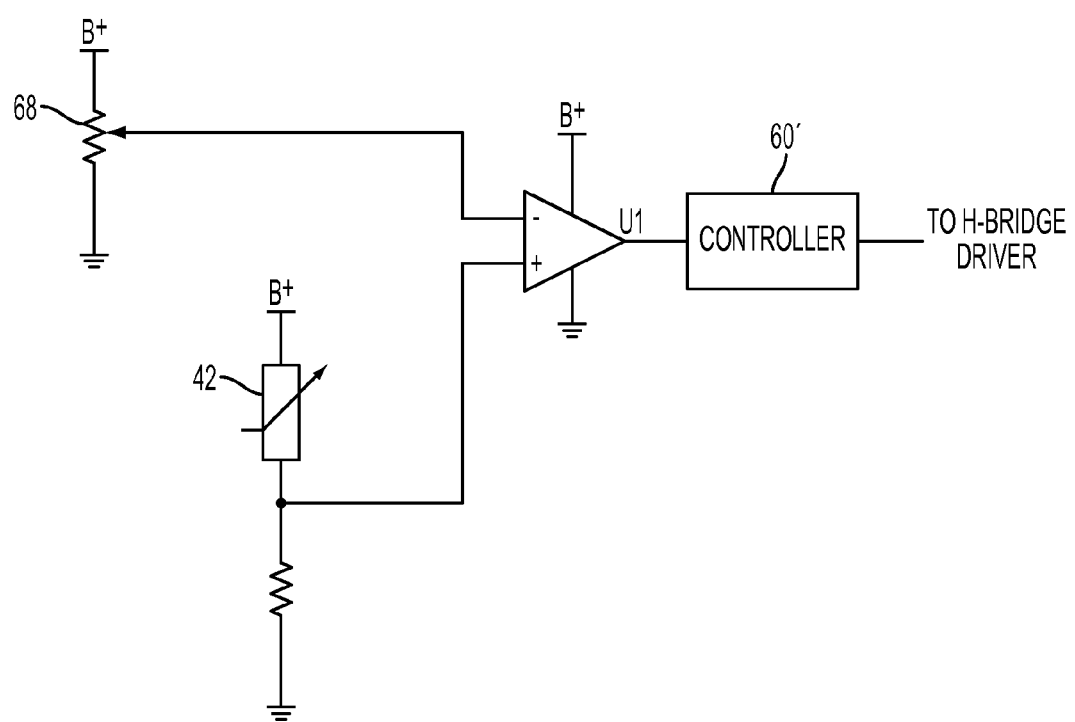
FIG. 11 is a schematic view of another embodiment of a portion of a control circuit for a force sensing electronic clutch.

Referring to FIG. 11, in an alternative embodiment, a controller 60' may be used that does not have enough inputs to receive signals from both the clutch setting sensor 68 and the force sensor 42 to compare the sensed force to the desired clutch setting. In this case, the signals from the force sensor 42 and clutch setting sensor 68 can be compared outside of the controller using a comparator U1. The comparator may output a digital signal to the controller 60' that instructs the controller 60' whether or not to actuate the clutch.

Figure 5:
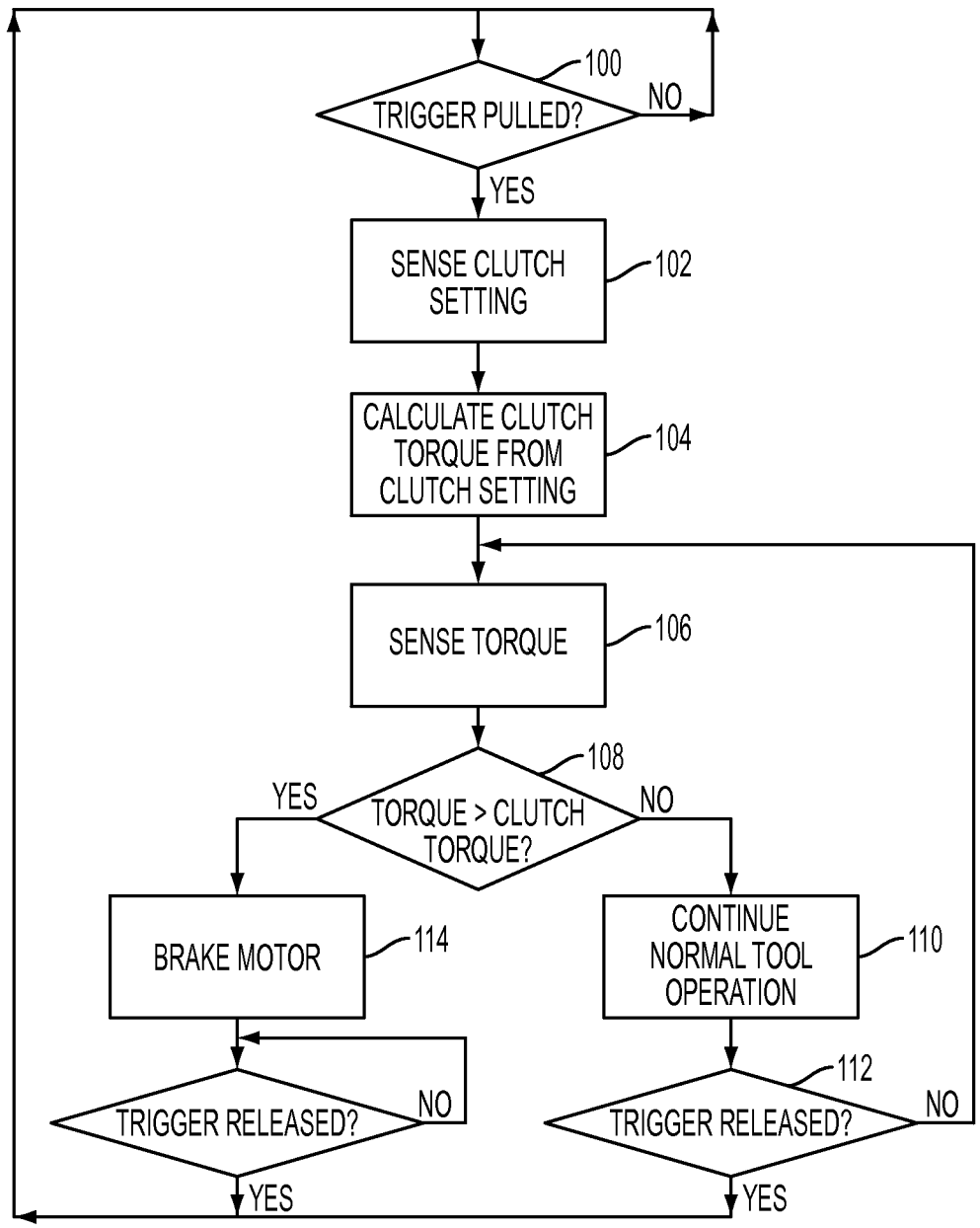
FIG. 5 is a flow chart illustrating one mode of operation of a force-sensing electronic clutch.

The tool 10 can be operated in one or more of several different modes of operation. Referring to FIG. 5, in one mode of operation, the controller 60 first determines whether the trigger switch 18 has been pulled (step 100). Next, the controller senses the clutch setting from the clutch setting sensor 68 (step 102). The controller then calculates the desired clutch torque from the clutch setting, e.g., by using a look-up table or applying a mathematical function to the signal (step 104). Next, the controller senses the torque output signal from the force sensor, which is proportional to the torque on the ring gear (step 106). The controller 60 then compares the sensed torque to the torque clutch setting (step 108). If the sensed torque is less than or equal to the torque clutch setting, then normal operation of the tool is continued (step 110) until then trigger switch is released (step 112) or until the sensed torque exceeds the torque clutch setting (steps 106 and 108). If the sensed torque is greater than the torque clutch setting, then the controller initiates a protective operation, such as, e.g., power to the motor is interrupted or reduced or the motor is braked (step 114) until the trigger is released (step 116).

Figure 6:
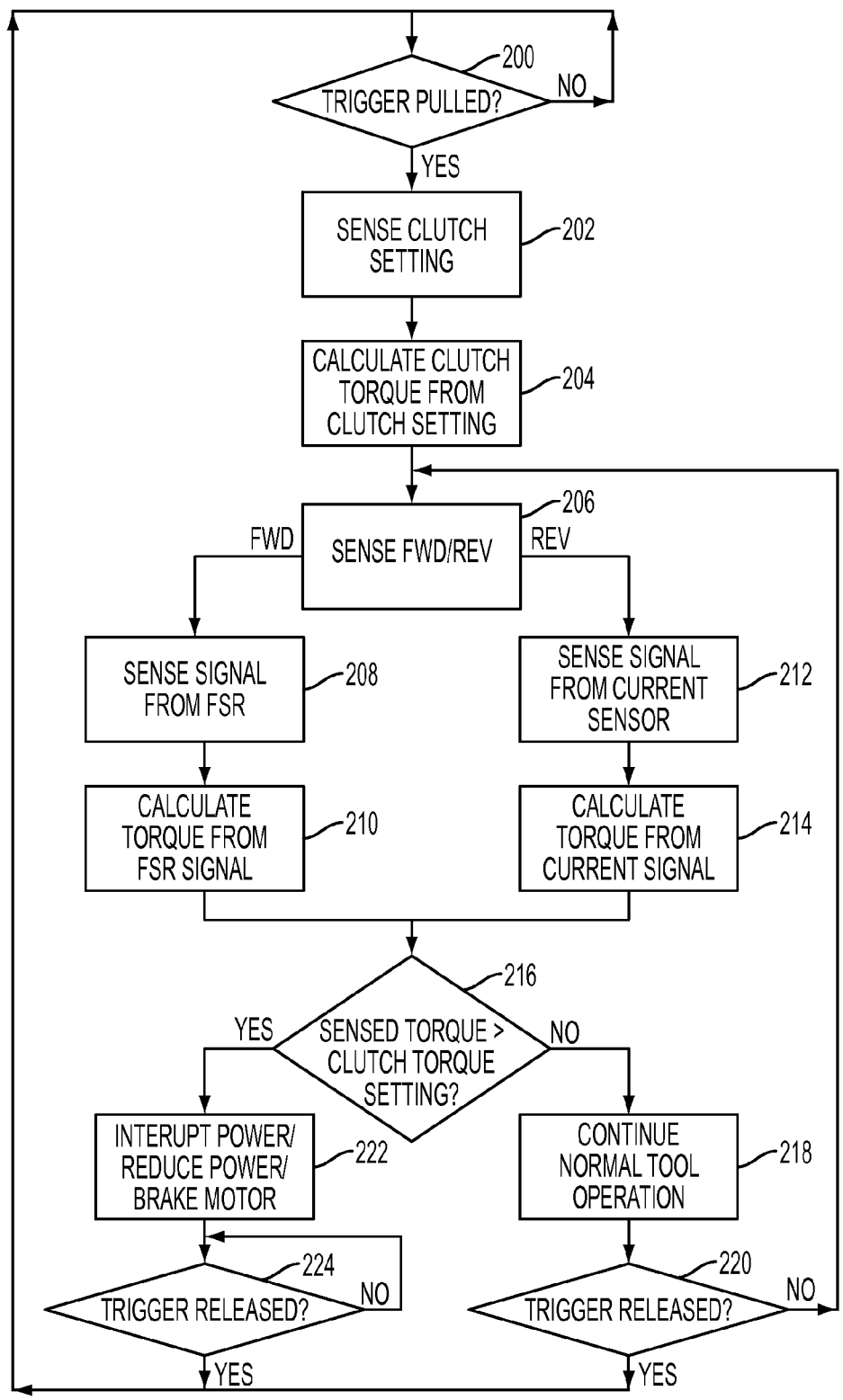
FIG. 6 is a flow chart illustrating another mode of operation of a force-sensing electronic clutch.

Referring to FIG. 6, in another mode of operation, the controller 60 first determines whether the trigger switch 18 has been pulled (step 200). Next, the controller senses the clutch setting from the clutch setting sensor 68 (step 202). The controller then calculates the desired clutch torque from the clutch setting, e.g., by using a look-up table (step 204). Next, the controller senses whether the tool is running in forward or reverse from the forward/reverse sensor (step 206). If the tool is running forward, the controller senses the torque output signal from the force sensor, which is proportional to the torque on the ring gear (step 208), and calculates the torque based on this signal (step 210). If the tool is running in reverse, the controller senses the current output signal of the current sensor (step 212) and then calculates torque from this signal (step 214). In either case (forward or reverse), the controller 60 then compares the calculated torque to the torque clutch setting (step 216). If the sensed torque is less than or equal to the torque clutch setting, then normal operation of the tool is continued (step 218) until then trigger switch is released (step 220) or until the sensed torque exceeds the torque clutch setting (steps 216). If the sensed torque is greater than the torque clutch setting, then the controller initiates a protective operation, e.g., power to the motor is interrupted or reduced or the motor is braked (step 222) until the trigger is released (step 224).

The illustrated force sensor and associated process provides a much more accurate way of sensing the output torque of the tool and initiating a protective operation (e.g. interrupting or reducing the power to the motor) than a traditional mechanical clutch or electronic clutch that uses a current sensor. The force sensor is largely insensitive to changes in motor speed and to the duty cycle of the power driving the motor. This provides a much more direct measurement of force and much faster response time than a current sensor. However, it has been discovered that many force sensors, including force sensors, tend to have a force-resistance relationship that drifts over time and with changes in temperature. It is therefore desirable to provide a computational process to automatically correct for this drift.

Figure 7:
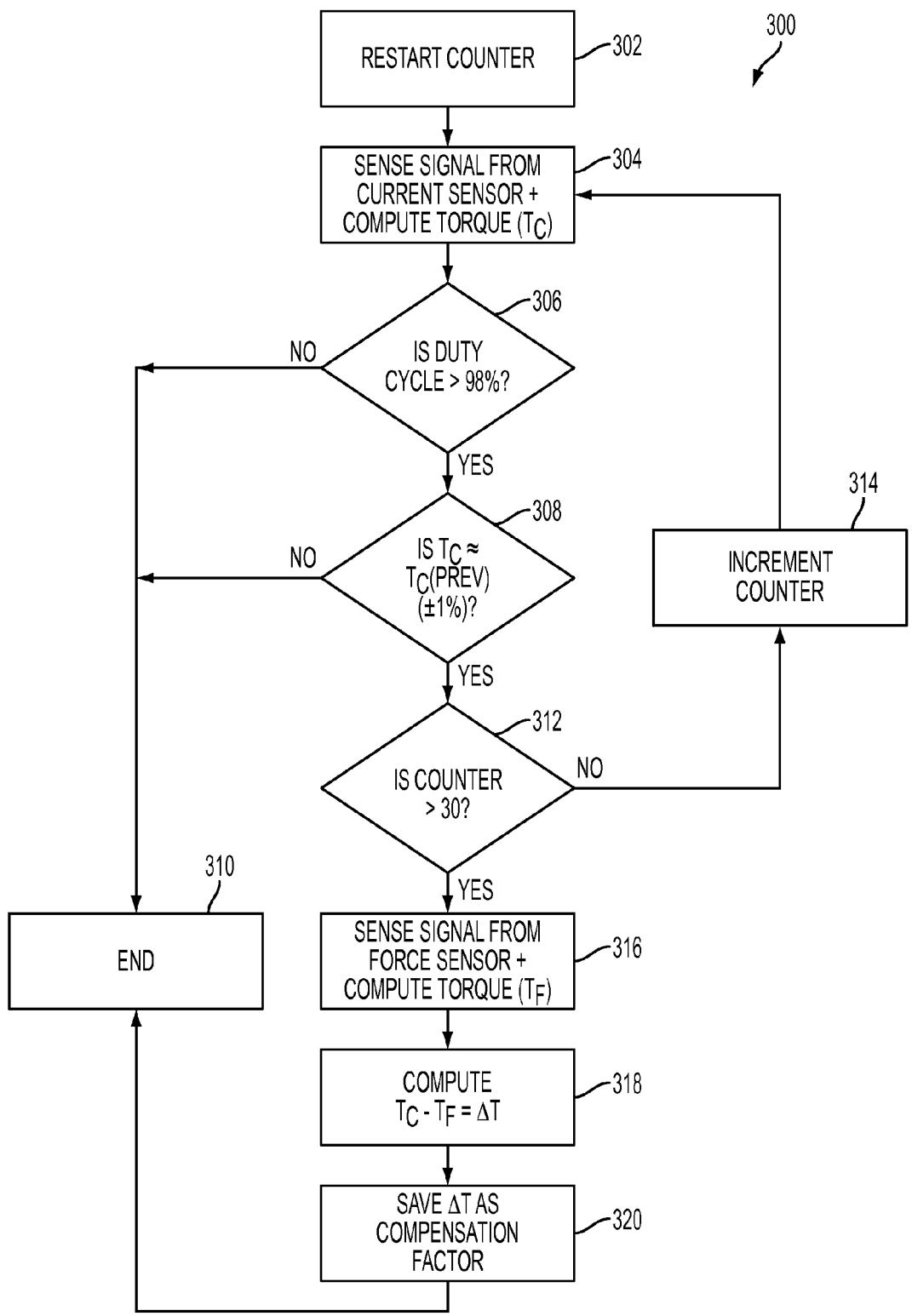
FIG. 7 is a flow chart illustrating a calibration subroutine for a force-sensing electronic clutch.

Referring to FIG. 7, in another mode of operation, the controller 60 implements a calibration subroutine 300, which can be added at any point during the processes illustrated in FIGS. 5 and 6, or can be processed in parallel. First a counter is reset to zero (step 302). Next, the controller receives the signal from the current sensor and computes the torque value (Tc) from that signal (step 304). The controller 60 then determines whether the duty cycle is close to 100% (e.g., >98%) (step 306) and whether the calculated torque Tc is approximately equal to the previous torque reading Tc (e.g., +/−1%) (step 308). These two values are indicative of steady-state operation where the current sensing clutch provides an accurate measurement of the output torque. If the answer to either is NO (i.e., current sensing clutch is not accurate because tool is not in steady state), then the subroutine ends (310) and no compensation factor is generated.

If the answer to both is YES (i.e., current sensing clutch is accurate because tool is in steady state), then the controller checks whether the tool has been in the same steady state for a sufficient amount of time to be accurate by checking whether the counter has reached a predetermined value (e.g., 30) (step 312). If NO, then the counter is incremented (step 314), the current signal is sensed, and the duty cycle and Tc comparisons are made again. This loop repeats until the tool has remained in a steady-state for a sufficient amount of time to ensure that the current sensor is an accurate measurement of torque.

Once the answer at step 310 is YES, the controller then senses the signal from the force sensor and computes the torque value from the force sensor (Tf) (step 316). Then the controller then computes the difference between the torque value from the current sensor Tc and the torque value from the force sensor Tf to generate a compensation factor $\Delta T$ (step 318), which is saved in a memory (step 320). Because the torque value of the current sensor Tf is accurate in steady state, $\Delta T$ represents a factor that can be added to or subtracted from future calculations of the force sensor torque Tf in the processes of FIGS. 5 and 6 to correct for drift or temperature variations affecting the force sensor. It should be understood that other, more complex mathematical functions could also be used in calculating the torque compensation factor.

In another embodiment, it may also be desirable to avoid operating the force sensor at a high temperature, in order to combat drift and to prevent damage to the force sensor. For example, a temperature senior may be positioned proximate the force sensor to sense the temperature at or near the force sensor. If the temperature sensor and controller determine an elevated temperature that exceeds a threshold value, the controller may disable the tool and/or electronic clutch until the temperature has cooled.

In other embodiments, the above-described force sensing clutches can be used with a powered driving tool that is used to install band clamps or couplings (also known as no hub bands) that are used to connect two pipes, such as, for example, no hub bands sold by Fernco, Inc. Typically these couplings have a steel sleeve around a rubber ring, which distributes the load from the clamps. To install a no hub band, the operator has to first tighten one clamp then move to the next and so on until all clamps are tight. The problem is that when tightening the next clamp the further compression on the steel sleeve relaxes the hoop stress generated by the previous tightening. The proper assembly method is supposes to incorporate repeating this process several times until the relaxation is minimized.

Such a no hub driving tool may be similar in design to the drill/driver described above and including the force sensing electronic clutch and/or the current sensing electronic clutch. Using the force sensor, the controller can compute the rate of increase of torque per rotation of the end effector or per time period. Using this data, the controller can estimate the softness of the joint, since in no-hub joints, the rate of relaxation decreases as the joint stiffness increases. Therefore, when the joint becomes hard this is an indication that no more tightening is needed. When no further tightening is needed, the controller may initiate a protective operation, e.g., interrupting or reducing power to the motor and/or actively braking the motor. The controller may also cause a light to be illuminated to indicate joint tightness. For example, the tool may include a red light and a green light that indicate whether additional tightening is needed.

In another related embodiment, the time needed to install a no-hub band further may be decreased by the controller causing the application of more torque than the target torque for installation of the first band, with the expectation of relaxation as other bands are tightened. In addition, or in the alternative, real-time torque values calculated from the force sensor may be used to anticipate when the final torque will be reached. For example, prior to reaching the target torque (e.g., when reaching approximately 80% of the target torque), the controller may begin to slow down the motor while tightening. This would improve accuracy while also reducing kickback of the tool. In another embodiment, at some percentage of the target torque (e.g., approximately 50% of the target torque), the controller can cause the output end effector to turn by a predetermined number of turns to reach the final setting. Combining this with slowing the motor could also reduce kickback. Further, providing dwell at the set torque may improve the distribution of the tightness on a group of no hub bands.

Figure 18:
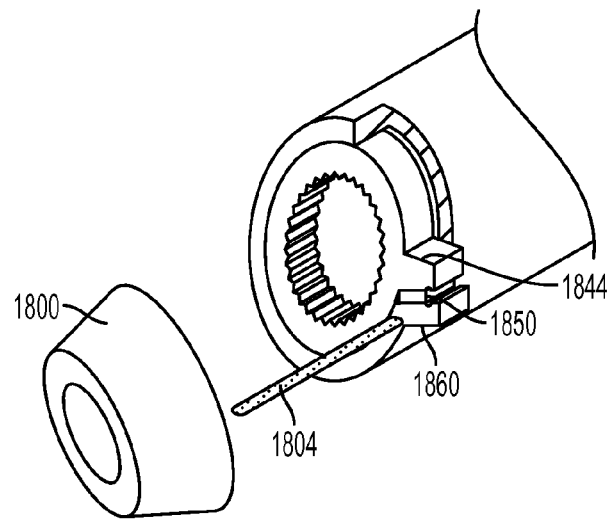
FIG. 18 is a perspective view of an embodiment of a transmission with a force-sensing electronic clutch that further includes a drill mode lockout for disabling the clutch.
Figure 19:
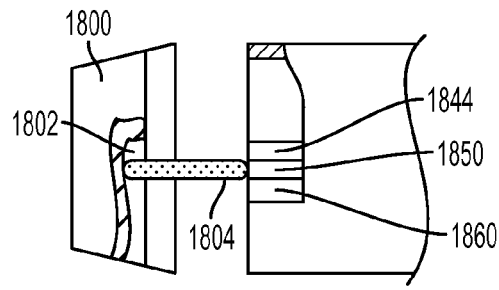
FIG. 19 is a cross-sectional view of the drill mode lockout of FIG. 18 showing the force-sensing electronic clutch enabled.
Figure 20:
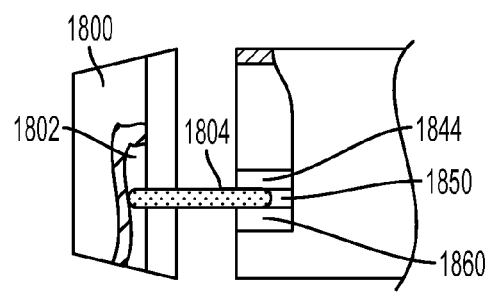
FIG. 20 is a cross-sectional view of the drill mode lockout of FIG. 18 showing the force-sensing electronic clutch disabled.

Referring to FIGS. 18-20, in another alternative embodiment, the force sensor clutch may disabled in a drill mode of operation so that the clutch will not be actuated when the tool is being used for drilling. For example, the power tool may include a mode collar 1800 for selecting between a drill mode and a clutch mode of operation in a known manner. The mode collar 1800 may include a cam surface 1802 and a pin 1804 where the cam surface 1802 pushes the pin rearward when in the drill mode (FIG. 20) and allows the pin to move forward when in the clutch mode (FIG. 19). When the pin moves rearward in the drill mode (FIG. 20), the pin acts as a blocking element between the lug of the ring gear 1844 and the walls of the pocket of the housing 1860 to prevent a force from being applied to the force sensor 1850, thus, preventing actuation of the clutch. This would also reduce the load cycles on the force sensor during drilling, thus improving the life of the force sensor.

Figure 23:
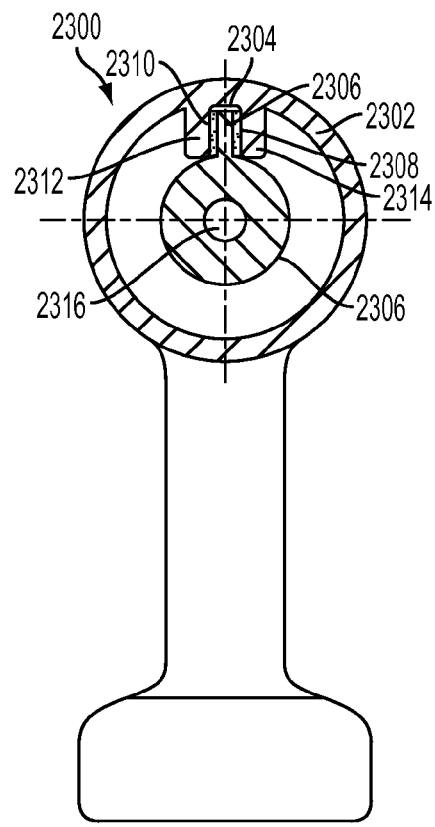
FIG. 23 is a cross-sectional view of a first embodiment of a power tool with a force-sensitive resistor for sensing motion of the tool housing as part of a system to initiate a protective operation during uncontrolled motion of the tool housing.
Figure 24:
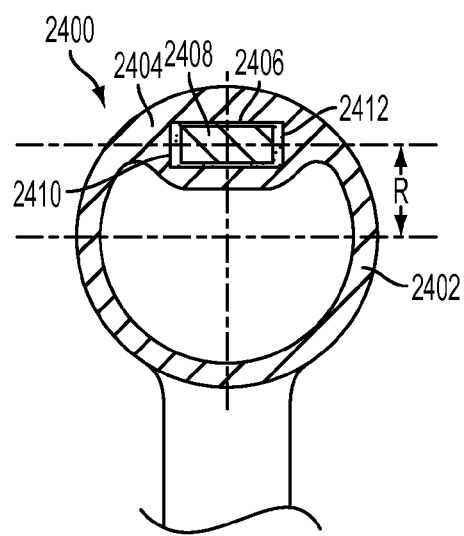
FIG. 24 is a cross-sectional view of a second embodiment of a power tool with a force-sensitive resistor for sensing motion of the tool housing as part of a system to initiate a protective operation during uncontrolled motion of the tool housing.

Referring to FIGS. 23 and 24, in other implementations, a force sensor, such as a thin-film resistive sensor, may be used in a rotary power tool to prevent the power tool from injuring a user when a high reaction torque is experienced in a short duration (e.g., when the bit becomes bound-up in the workpiece and kicks back on the user). It is known in the art to use a motion sensor, such an accelerometer or a gyroscopic sensor to sense uncontrolled motion of a power tool housing, and then initiate a protective operation (e.g., reduce or interrupt power transmission to the motor, actively brake the motor, and/or open a mechanical clutch or connection in the transmission), in order to prevent injury to a user due to uncontrolled bind-up or kickback of the tool. Such systems are described, e.g., in U.S. Pat. Nos. 6,111,515, 7,410,006, and 7,552,781, and U.S. Pat. App. Pub. No. 2008/0011102, each of which is incorporated by reference.

Referring to FIG. 23, in one possible embodiment, a power tool 2300 includes a housing 2302 having a pair of internally extending walls 2312, 2314 that define a recess 2304. A rotary mass 2306 with a radial lug 2306 is mounted in the housing 2302 on a low friction bearing 2316 that is coincident or near the axis of the tool's output shaft. The radial lug 2306 is received the in the recess 2304 between the walls 2312, 2314. A pair of force sensors 2308, 2310 (e.g., thin film force sensors) are mounted between the lug 2304 and each of the walls 2312, 2314. When the tool kick-back, the housing is angularly accelerated, the lug 2304 of the mass exerts a force against one of the sensors 2308, 2310 and walls 2312, 2314 (which one depends on the direction of kickback). The sensor 2308 or 2310 senses the force, and transmits a signal to the controller. The controller can use the signal from the sensors to infer the angular displacement, velocity, and/or acceleration due to the kickback, and, if a threshold is exceeded, initiate a protective operation (e.g., interrupt or reduce power to the motor, actively brake the motor, and/or actuate a mechanical clutch).

Referring to FIG. 24, in another possible embodiment, a power tool 2400 includes a housing 2402 having an outer wall 2404 that defines a cavity 2406 at a distance R from the tool axis. Received in the cavity 2406 is a mass 2408. Disposed between the ends of the mass 2408 and the inside surfaces of the cavity 2406 are two force sensors 2410, 2412 (e.g., thin film force sensors). When the tool kick-back, the housing is angularly accelerated, the mass 2408 exerts a force against one of the sensors 2308, 2310 (which one depends on the direction of kickback). The sensor 2308 or 2310 senses the force, and transmits a signal to the controller. The controller can use the signal from the sensors to infer the angular displacement, velocity, and/or acceleration due to the kickback, and, if a threshold is exceeded, initiate a protective operation (e.g., interrupt or reduce power to the motor, actively brake the motor, and/or actuate a mechanical clutch).

Figure 21:
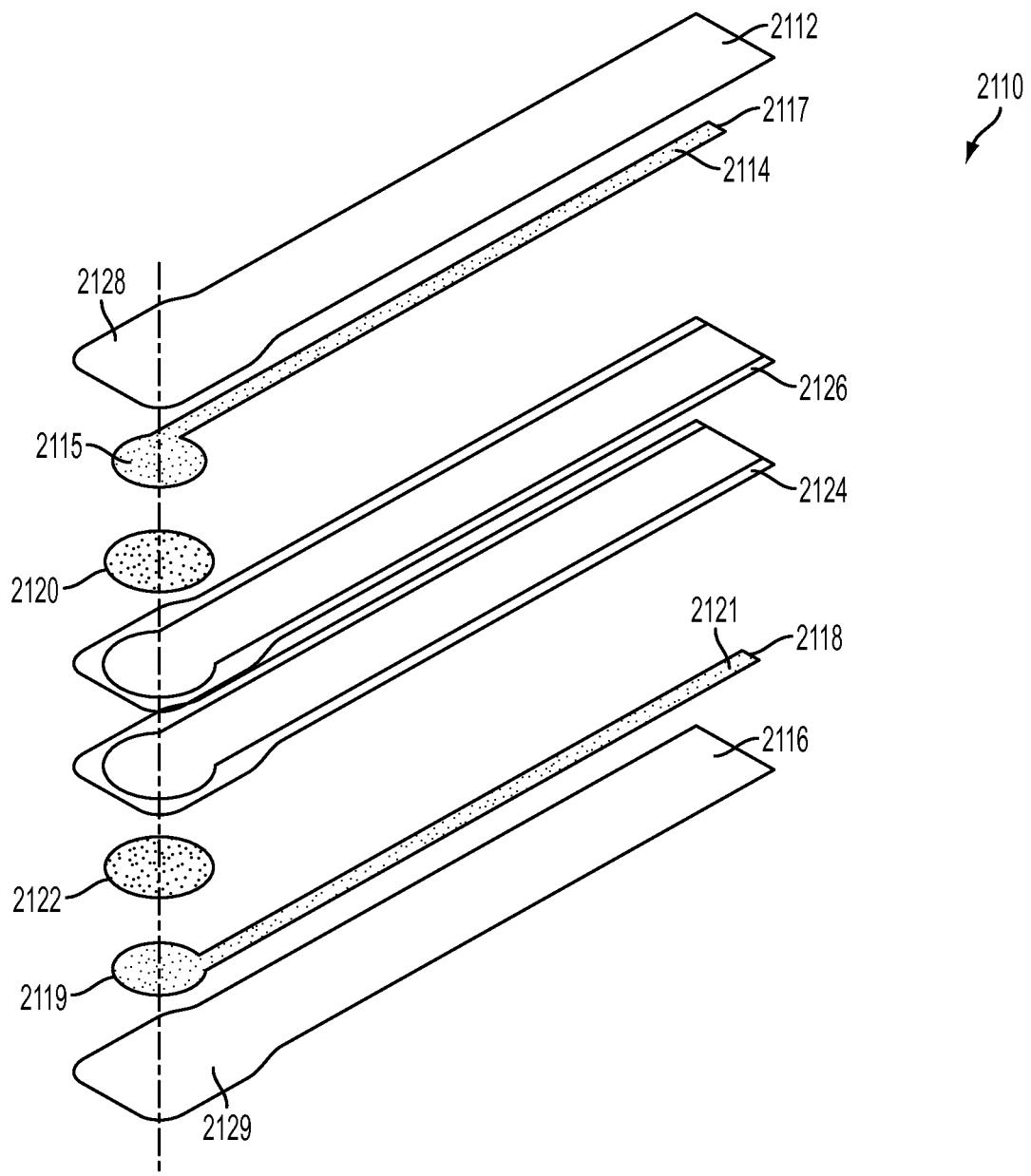
FIG. 21 is an exploded view of a second embodiment of a force sensitive resistor for use with a force sensing electronic clutch.

Referring to FIG. 21, in another implementation, the force sensor used in the above-described embodiments, may be a through-mode thin-film force sensor 2110. The sensor 2110 includes a first non-conductive substrate layer 2112 and a second non-conductive substrate layer 2114, such as a flexible membrane or a rigid printed circuit board. Each substrate has a slightly enlarged pressure pad portion 2128, 2129. Attached to first substrate layer 2112 is a first (positive) electrode 2114 in the form of a strip or trace of conductive material that is etched, printed, drawn or otherwise attached to the substrate layer. Attached to the second substrate layer 2114 is a second (negative) electrode 18 in the form of a strip or trace of conductive material that is etched, printed, drawn or otherwise attached to the substrate layer. The first and second electrodes 2114, 2116 each have a front end 2115, 2119 beneath the pressure pad portions 2128, 2129, and a rear end 2117, 2121 at an opposite end of the substrate layers. Sandwiched between the front ends 2115 and 2119 of the electrodes 2114 and 2118 are one or more resistive layers 2120, 2122 composed of a resistive or semi-conductive material. The resistive layers 2120, 2122 are pressure sensitive insofar as they are composed of a material or materials that are at least partially electrically conductive, and that vary in electrical resistance as a force or pressure is applied to them. The resistive layers 2120, 2122 are electrically coupled to each other and to the electrodes 2114 and 2118. Optionally, the force sensor 2110 may include one or more spacers 2124, 2126 that space the electrodes 2114 and 2118 from one another. The spacers 2124, 2126 may have an adhesive backing to adhere the non-conductive substrate layers 2112 and 2116 to one another. The rear ends 2117, 2121 of the electrodes 2112, 2116 can be electrically connected to other circuit components to complete an electrical circuit.

In an implementation of the sensor 2110, the resistive layers 2120, 2122 may be printed in a specific pattern using a resistive or semiconductive ink. In one particular implementation, the resistive ink contains graphene. When pressure is applied to the resistive or semiconductive ink, the pattern deforms, causing the resistance of the ink pattern to decrease. Graphene is an allotrope of carbon, whose structure is one-atom-thick planar sheets of sp2-bonded carbon atoms that are densely packed in a honeycomb crystal lattice. Graphene is a semi-metal or zero-gap semiconductor. An ink that contains graphene has an electrical resistance that decrease as the amount of pressure applied to the ink increases. In one embodiment, the graphene ink used can be the graphene-based ink sold commercially under the trade name Vor-Ink™ by Vorbeck Materials Corporation of Jessup, Md. Other types of conductive or semi-conductive ink containing graphene can be used. The graphene ink may be printed in a certain pattern of lines (rather than a large dot) to enhance the resolution of the sensor. In one implementation, the electrodes 2114 and 2116 are printed using a conductive ink or material, such as silver or copper. In another implementation, the electrodes may instead be printed using a resistive or semiconductive ink, such as a graphene containing ink.

In use, to monitor an force applied to the sensor 2110, the electrodes 2114, 2118 are electrically coupled to an electrical circuit, and the pressure pad portions 2128, 2129 are placed in a location where force is to be monitored. The circuit applies an electrical current to the electrodes 2114, 2118 through the resistive layers 2120, 2122. The circuit can sense the amount of voltage drop across the resistive layers 2120, 2122 as an indication of the amount of force applied to the pressure pad 2128. Thus, a force is applied to the pressure pad 2128, the resistance of the resistive elements 2120, 2122 decreases, causing a decrease in the voltage drop. Thus, the circuit can use the amount of the voltage drop to infer or calculate the amount of force being applied to the sensor.

Figure 22:
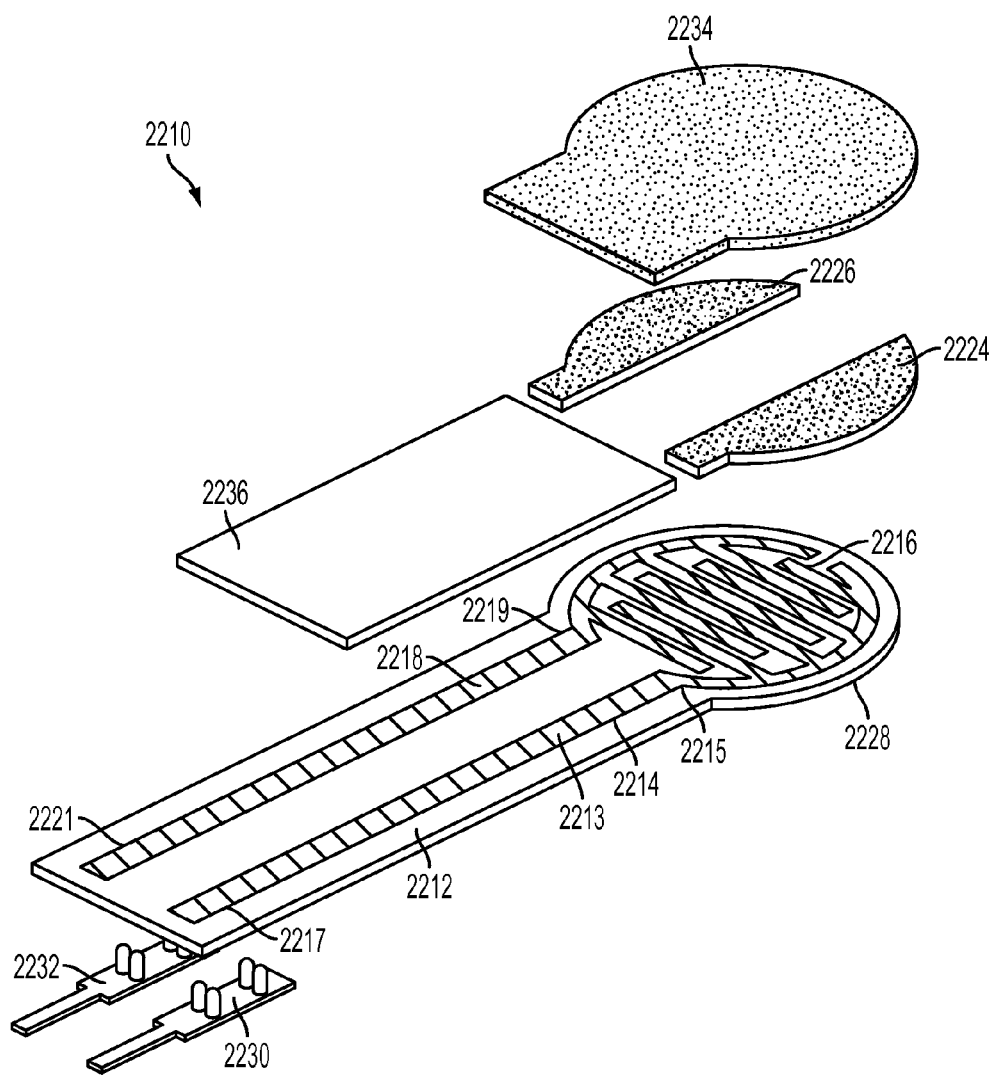
FIG. 22 is an exploded view of a third embodiment of a force sensitive resistor for use with a force sensing electronic clutch.

Referring to FIG. 22, in another implementation, the force sensor used in the above-described embodiments may be a shunt-mode thin-film force sensor 2210 comprises a first non-conductive substrate layer 2212, such as a flexible membrane or a rigid printed circuit board. The substrate layer 2212 has a slightly enlarged pressure pad portion 2228. Attached to substrate layer 2212 is a conductive layer 2213 of conductive material that is etched, printed, drawn or otherwise attached to the substrate layer. The conductive layer 2213 includes a first (positive) electrode 2214 with a front end 2215 and a rear end 2217, and a parallel second (negative) electrode 2218 with a front end 2219 and a rear end 221. Extending from the front end of each electrode is a plurality of conductive connectors 2216, printed in a pattern so that each connector extends from one of the electrodes, but does not touch any of the connectors extending from the other electrode to form a complete electrical circuit. Attached to the rear ends 2217, 2221 of the electrodes are a pair of staple electrical connectors 2230, 2232 for electrically coupling the electrodes to an electrical circuit.

Adhered to the pressure pad portion 2228 and to the conductive connectors 2228 is a resistive polymer layer 2234 composed of a material or materials that are at least partially electrically conductive, and that vary in electrical resistance as a force or pressure is applied to the layer. The resistive polymer layers 2234 is electrically coupled to conductive connectors 2228 of each electrode 2214, 2218 so as to form a circuit between the electrodes 2214, 2218. In one implementation, the force sensor 2210 may also include one or more spacers 2224, 2226 that space the conductive connectors 2228 from the resistive polymer layer 2234 so that no current will flow unless at least some pressure is applied to the resistive polymer layer 2234. The spacers 2224, 2226 may also have an adhesive backing to adhere the non-conductive substrate layer 2212 to the resistive polymer layer 2234. The sensor 2210 may additionally include a non-conductive cover layer 2236 (e.g., a plastic cover) that covers the electrodes 2214, 2218

In an implementation of sensor 2210, the resistive polymer layer 2234 may include a layer of semiconductive or resistive ink printed on a polymer substrate. In one particular implementation, the resistive ink may contain graphene. In another implementation, the entire resistive layer can be composed of a layer of resistive or semi-conductive material that may contain graphene. When pressure is applied to the resistive polymer layer, the layer comes into contact with the conductive connecters 2228 and deforms, causing the resistance of the layer to decrease. In one embodiment, the graphene layer may include the graphene-based ink sold commercially under the trade name Vor-Ink™ by Vorbeck Materials Corporation of Jessup, Md. Other types of conductive or semi-conductive ink containing graphene can be used. The graphene ink may be printed in a certain pattern of lines (rather than a large dot) to enhance the resolution of the sensor. In one implementation, the electrodes 2214 and 2216 may be printed using a conductive ink or material, such as silver or copper. In another implementation, the electrodes may instead be printed using a resistive or semiconductive ink, such as a graphene containing ink.

In use, to monitor a force applied to the sensor 2210, the staple connectors 2230, 2232 are electrically coupled to an electrical circuit, and the pressure pad portion 2228 is placed in a location where force is to be monitored. The circuit applies an electrical current to the electrodes 2214, 2218 through the resistive layers 2234. The circuit can sense the amount of voltage drop across the resistive layer 2234 as an indication of the amount of force applied to the pressure pad 2228. Thus, a force is applied to the pressure pad 2228, the resistance of the resistive layer 2234 decreases, causing a decrease in the voltage drop. Thus, the circuit can use the amount of the voltage drop to infer or calculate the amount of force being applied to the sensor.

The disclosed thin-film force sensors using a graphene containing resistive layer and/or conductive layer is superior to existing thin-film force sensors because the graphene based layer(s) enable the sensor to detect a wider range of forces, to operate at higher operating temperatures, to be less sensitive to temperature fluctuations, and to be generally less expensive than prior art force based sensors. This thin-film force sensor may have numerous applications in addition to power tools, such as, for example, automotive devices, pointing devices (e.g., a joystick, mouse, or tablet computer), keypads, and cellular phones.

Numerous other modifications may be made to the exemplary implementations described above, and within the scope of the following claims.

What is claimed is:

1. A power tool comprising:
a housing;
a motor disposed in the housing;
a transmission disposed in the housing and coupled to the motor and defining a longitudinal axis;
an output end effector coupled to the transmission;
a control circuit for controlling power delivery from a power source to the motor; and
a force sensing electronic clutch including a force sensor coupled to a substantially stationary element of the transmission to sense a reaction torque transmitted from the end effector to at least a portion of the transmission, the substantially stationary element having one of a projection and a recess that mates with the other of a projection and a recess on the housing so that the force sensor is disposed between and in a common plane with the projection and the recess, the common plane being transverse to the longitudinal axis, wherein the sensor is configured to generate a first electronic signal corresponding to an amount of the reaction torque, and wherein the control circuit compares the first electronic signal with a second electronic signal corresponding to a desired threshold torque value, and initiates a protective operation when a value of the first electronic signal indicates that the reaction torque has exceeded the desired threshold torque value.

2. The power tool of claim 1, wherein the sensor comprises a thin film force sensing resistor.

3. The power tool of claim 1, wherein the transmission comprises a planetary gear set having a sun gear, at least one planet gear, a ring gear, and a planet gear carrier, and wherein the force sensor is coupled to a substantially stationary gear of the planetary gear set.

4. The power tool of claim 3, wherein the force sensor is coupled to the ring gear.

5. The power tool of claim 1, further comprising a clutch setting switch that enables a user to adjust the desired threshold torque value.

6. The power tool of claim 5, further comprising a position sensor that senses the position of the clutch setting switch.

7. The power tool of claim 1, wherein the protective operation comprises one or more of interrupting or reducing power to the motor, actively braking the motor, and actuating a mechanical clutch.

8. The power tool of claim 1, wherein the sensor comprises a first layer having a conductive pattern on a non-conductive substrate, a second layer having a conductive pattern on a non-conductive substrate, and a third layer between the first layer and the second layer, the third layer having a resistive or semi-conductive pattern on a non-nonconductive substrate.

9. The power tool of claim 8, wherein the resistive or conductive pattern is printed with a material containing graphene.

10. A power tool comprising:
a housing;
a motor disposed in the housing;
a transmission disposed in the housing and coupled to the motor;
an output end effector coupled to the transmission;
a control circuit for controlling power delivery from a power source to the motor;
a force sensing electronic clutch including a force sensor that senses a reaction torque transmitted from the end effector to at least a portion of the transmission and causes the control circuit to initiate a first protective operation when the sensed reaction torque exceeds a first threshold torque value; and
a current sensor that senses an amount current delivered to the motor,
wherein the control circuit uses a current signal from the current sensor to automatically re-calibrate the first electronic signal from the force sensor, during a period when the control circuit determines that the current signal by itself is a good indicator of output torque.

11. The power tool of claim 10, wherein the control circuit re-calibrates the first electronic signal by determining a compensation factor to add to or subtract from the first electronic signal based on the current signal.

12. The power tool of claim 10, wherein the force sensor is coupled to substantially stationary portion of the transmission.

13. The power tool of claim 12, wherein the transmission comprises a planetary gear set having a sun gear, at least one planet gear, a ring gear, and a planet gear carrier, and wherein the force sensor is coupled to a substantially stationary gear of the planetary gear set.

14. The power tool of claim 10, wherein the current sensor is part of a current sensing electronic clutch that causes the controller to initiate a second protective operation when a value of the current signal exceeds a current threshold value that corresponds to the desired threshold torque value.

15. The power tool of claim 14, wherein the force sensing electronic clutch is activated and the current sensing electronic clutch is deactivated when the motor is driving the end effector in a first mode of operation, and the force sensing electronic clutch is deactivated and the current sensing electronic clutch is activated when the motor is driving the end effector in a second mode of operation.

16. The power tool of claim 10, wherein the first protective operation comprises one or more of interrupting or reducing power to the motor, actively braking the motor, and actuating a mechanical clutch.

17. A power tool comprising:
a housing;
a motor disposed in the housing;
a transmission disposed in the housing and coupled to the motor;
an output end effector coupled to the transmission;
a control circuit for controlling power delivery from a power source to the motor;
a force sensing electronic clutch including a force sensor that senses a reaction torque transmitted from the end effector to at least a portion of the transmission and causes the control circuit to initiate a first protective operation when the sensed reaction torque exceeds a first threshold torque value;
a current sensing electronic clutch including a current sensor that senses an amount current delivered to the motor, and a controller that causes the controller to initiate a second protective operation when a value from the current sensor exceeds a current threshold value that corresponds to a second threshold torque value.

18. The power tool of claim 17, wherein the force sensing electronic clutch is activated and the current sensing electronic clutch is deactivated when the motor is driving the end effector in a first direction, and the force sensing electronic clutch is deactivated and the current sensing electronic clutch is activated when the motor is driving the end effector in a second opposite direction.

19. The power tool of one claim 17, wherein each of the first protective operation and the second protective operation comprises one or more of interrupting or reducing power to the motor, actively braking the motor, and actuating a mechanical clutch.

20. The power tool of claim 17, wherein the force sensor is coupled to substantially stationary portion of the transmission.

21. The power tool of claim 20, wherein the transmission comprises a planetary gear set having a sun gear, at least one planet gear, a ring gear, and a planet gear carrier, and wherein the force sensor is coupled to a substantially stationary gear of the planetary gear set.

22. The power tool of claim 17, wherein the force sensing electronic clutch is activated and the current sensing electronic clutch is deactivated when the motor is driving the end effector in a first mode of operation, and the force sensing electronic clutch is deactivated and the current sensing electronic clutch is activated when the motor is driving the end effector in a second mode of operation.

\* \* \* \* \*